US009591396B2

(12) United States Patent
Lee et al.

(10) Patent No.: US 9,591,396 B2
(45) Date of Patent: Mar. 7, 2017

(54) EAR SET DEVICE

(71) Applicant: LG Electronics Inc., Seoul (KR)

(72) Inventors: Heungkyu Lee, Seoul (KR); Sungwook Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/001,949

(22) Filed: Jan. 20, 2016

(65) Prior Publication Data

US 2016/0212522 A1    Jul. 21, 2016

(30) Foreign Application Priority Data

Jan. 21, 2015  (KR) .................. 10-2015-0010177
Nov. 5, 2015   (KR) .................. 10-2015-0155344

(51) Int. Cl.
*H04R 1/10*    (2006.01)
*B60W 50/14*   (2012.01)
(Continued)

(52) U.S. Cl.
CPC ........... *H04R 1/1091* (2013.01); *B60W 50/14* (2013.01); *G10L 19/00* (2013.01); *H04R 1/1041* (2013.01);
(Continued)

(58) Field of Classification Search
CPC ............. H04R 1/10; H04R 27/00; H04R 5/04
See application file for complete search history.

(56) References Cited

U.S. PATENT DOCUMENTS 9,404,765 B2 * 8/2016 Jiyama ................. G01C 21/365
2008/0319653 A1 * 12/2008 Moshfeghi ......... G01C 21/3608
                                                                701/532
(Continued)

FOREIGN PATENT DOCUMENTS

CN    104158566    11/2014
JP    2008-236636  10/2008
(Continued)

OTHER PUBLICATIONS

Office Action issued in Korean Application No. 10-2015-0010177 on Feb. 15, 2016, 5 pages.
(Continued)

*Primary Examiner* — Mohammad Islam
(74) *Attorney, Agent, or Firm* — Fish & Richardson P.C.

(57) ABSTRACT

An ear set device that includes a main body; and one or more earphones configured to output a response signal, wherein at least one of the one or more earphones includes: a first detecting unit configured to detect whether the one or more earphones are attached to a user, wherein the main body includes a communication unit configured to perform wireless communication with the one or more earphones, a second detecting unit configured to detect a location of the main body, and a control unit configured to, based on a determination that the main body is inside a vehicle and a determination that the vehicle is operating while the one or more earphones are attached to the user, receive, from the vehicle, information related to an operation of the vehicle and output a response signal corresponding to the received information through the one or more earphones is disclosed.

20 Claims, 18 Drawing Sheets

(51) Int. Cl.
*G10L 19/00* (2013.01)
*G01C 21/36* (2006.01)
*H04R 5/04* (2006.01)
*H04R 25/00* (2006.01)
*H04R 27/00* (2006.01)
*B60W 40/08* (2012.01)

(52) U.S. Cl.
CPC ............ *B60W 2040/0827* (2013.01); *B60W 2040/0881* (2013.01); *G01C 21/3652* (2013.01); *G01C 21/3661* (2013.01); *H04R 1/1083* (2013.01); *H04R 5/04* (2013.01); *H04R 25/00* (2013.01); *H04R 27/00* (2013.01); *H04R 2227/003* (2013.01); *H04R 2420/07* (2013.01); *H04R 2460/07* (2013.01); *H04R 2499/13* (2013.01)

(56) References Cited

U.S. PATENT DOCUMENTS

| | | |
|---|---|---|
| 2012/0148077 A1 | 6/2012 | Aldaz et al. |
| 2013/0329924 A1 | 12/2013 | Fleizach et al. |
| 2014/0056452 A1 | 2/2014 | Moss et al. |
| 2014/0058662 A1* | 2/2014 | Tachibana ............ G01C 21/00 701/428 |
| 2014/0242964 A1 | 8/2014 | Seo et al. |
| 2015/0031352 A1* | 1/2015 | Yi ........................ G01C 21/206 455/420 |
| 2015/0359015 A1* | 12/2015 | Hrabak ................. H04W 76/02 709/227 |
| 2015/0365771 A1* | 12/2015 | Tehrani ................ H04R 25/554 381/315 |
| 2016/0234870 A1* | 8/2016 | Borges ................... H04L 67/12 |

FOREIGN PATENT DOCUMENTS

| | | |
|---|---|---|
| KR | 10-1997-0040054 | 7/1997 |
| KR | 20-0293984 | 11/2002 |
| KR | 10-2005-0040400 | 5/2005 |
| KR | 10-0734354 | 7/2007 |
| KR | 10-2009-0110930 | 10/2009 |
| KR | 10-2011-0073193 | 6/2011 |
| KR | 10-2013-0139697 | 12/2013 |

OTHER PUBLICATIONS

Extended European Search Report issued in European Application No. 16151997.0 on Mar. 15, 2016, 7 pages.

\* cited by examiner

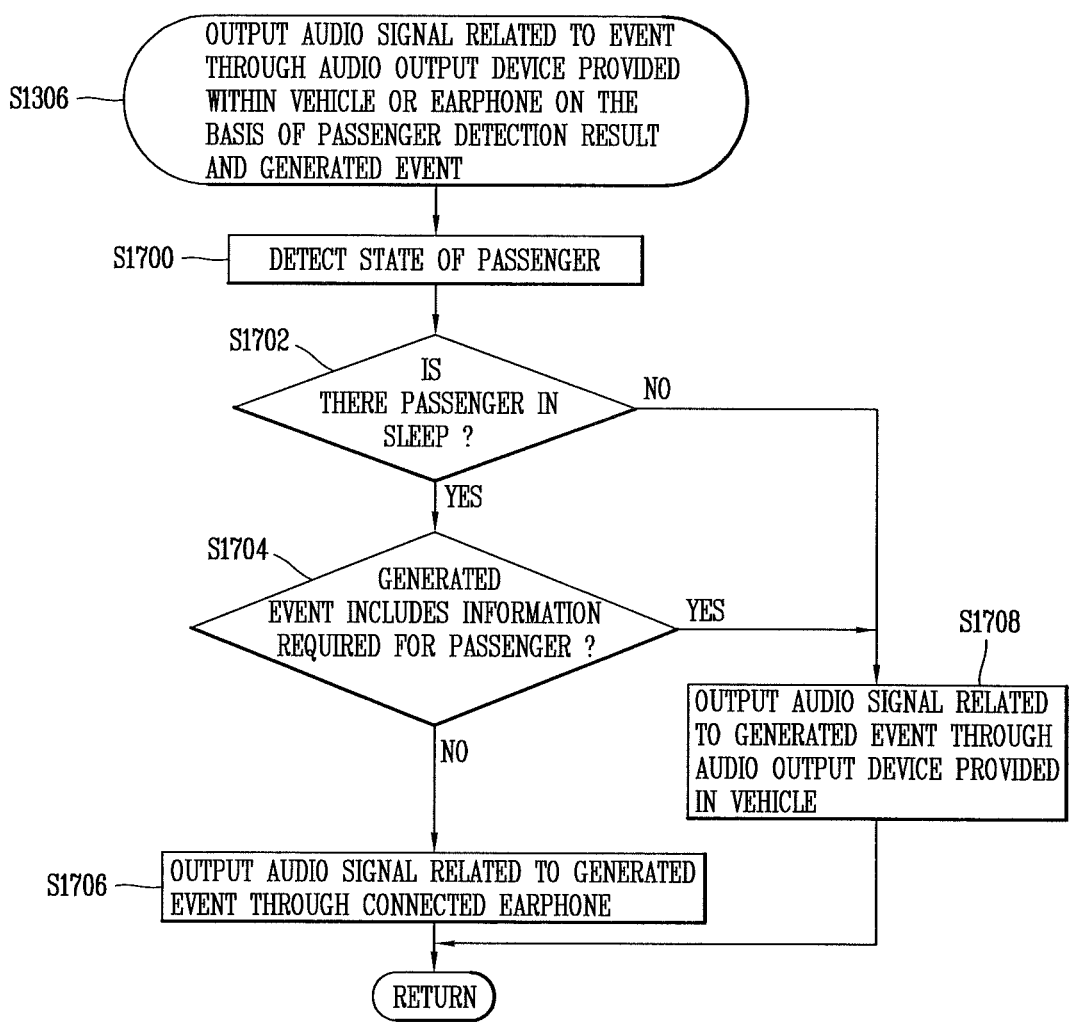

EAR SET DEVICE

CROSS-REFERENCE TO RELATED APPLICATION

Pursuant to 35 U.S.C. §119(a), this application claims the benefit of earlier filing date and right of priority to Korean Application No. 10-2015-0010177, filed on Jan. 21, 2015, and 10-2015-0155344, filed on Nov. 5, 2015, the contents of which are incorporated by reference herein in its entirety.

TECHNICAL FIELD

The present disclosure relates to an ear set device. The ear set device can be used in relation to a vehicle.

BACKGROUND

Mobile devices have become increasingly more functional. Examples of such functions include data and voice communications, capturing images and video via a camera, recording audio, playing music files via a speaker system, and displaying images and video on a display. More recently, mobile devices have been configured to receive broadcast and multicast signals which permit viewing of content such as videos and television programs.

SUMMARY

In general, one innovative aspect of the subject matter described in this specification can be embodied in an ear set device that includes a main body; and one or more earphones configured to output a response signal, wherein at least one of the one or more earphones includes: a first detecting unit configured to detect whether the one or more earphones are attached to a user, wherein the main body includes a communication unit configured to perform wireless communication with the one or more earphones, a second detecting unit configured to detect a location of the main body, and a control unit configured to, based on a determination that the main body is inside a vehicle and a determination that the vehicle is operating while the one or more earphones are attached to the user, receive, from the vehicle, information related to an operation of the vehicle and output a response signal corresponding to the received information through the one or more earphones.

The foregoing and other embodiments can each optionally include one or more of the following features, alone or in combination. In particular, one embodiment includes all the following features in combination. The vehicle further includes an audio output device configured to output the response signal in the vehicle, wherein the communication unit is configured to perform wireless communication with the audio output device, wherein the control unit is configured to determine that a preset event has occurred in the vehicle, determine that a passenger is detected in the vehicle, and output a response signal related to the preset event through either one of the audio output device or the one or more earphones, and wherein the audio output device is configured not to output the response signal related to the preset event while the response signal related to the event is output through the one or more earphones. The control unit is configured to determine that the preset event has occurred in the vehicle based on reception, by a mobile device connected to the vehicle, of a call or a message from a specific user, determine that the passenger is detected in the vehicle based on information received from a mobile device of the passenger or information received from the vehicle identifying the passenger, and output, based on the determination that the preset event has occurred in the vehicle and the determination that the passenger is detected in the vehicle, a sound alarm indicating reception of the call or the message through either one of the audio output device or the one or more earphones. The control unit is configured to output, based on the determination that the call or the message is from the specific user or a determination that the detected passenger is a preset passenger, audio information regarding content of the preset event through the one or more earphones. The control unit is configured to recognize that the preset event has occurred based on a determination that navigation information is generated, the navigation information including destination information related to a currently set destination and route guide information for guiding a route, determine that the generated navigation information is the destination information or the route guidance information, and output, based on the determination that the generated navigation information is the destination information or the route guide information, the navigation information through either one of the audio output device or the one or more earphones. The control unit is configured to recognize that the preset event has occurred based on a determination that disaster information related to a current accident or a current disaster is received, determine that the disaster information is related to the operation of the vehicle based on a determination that the disaster information includes information regarding a specific road or a bypass, and output, based on the determination that the disaster information is related to the operation of the vehicle, the disaster information through either one of the audio output device or the one or more earphones. The control unit is further configured to determine that the passenger is asleep based on a detection of the passenger, and output, based on the determination that the passenger is asleep, audio information regarding content of the preset event through either one of the audio output device or the one or more earphones. The control unit is configured to determine that the preset event includes content for the passenger based on a risk level identified from disaster information, and output, based on the determination that the preset event includes the content for the passenger, audio information related to the preset event through either one of the audio output device or the one or more earphones. The ear set device further includes a microphone configured to monitor an external audio signal from outside of the main body, wherein the control unit is configured to detect a human voice from the external audio signal, and output, based on a determination that the human voice is detected from the external audio signal, either the response signal corresponding to the received information or the human voice through the one or more earphones. The control unit is configured to suppress noise included in the external audio signal, emphasize the human voice detected from the external audio signal, and output either the human voice or the response signal corresponding to the received information. The control unit is configured to detect an alarming sound corresponding to a preset emergency from the external audio signal, and output, in response to detecting the alarming sound corresponding to the preset emergency, the response signal through the one or more earphones. The control unit is further configured to detect a direction that the alarming sound corresponding to the preset emergency occurs, and determine, based on the detected direction, at least one particular earphone from the one or more earphones to output the response signal. The vehicle is operating while the one or more earphones are attached to the user, and wherein the control unit is configured to output, through the one or more earphones, a response signal corresponding to information related to a connection with at least one separate device located in the vehicle and information related to an preset event received from the connected separate device. The at least one separate device includes a mobile device of the user, and wherein the control unit is configured to recognize that, based on a determination that a specific function is executed in the mobile device, the preset event has occurred, receive information related to the specific function from the mobile device, and output a response signal corresponding to the information related to the specific function through the one or more earphones. The specific function is transmitting and receiving a message, wherein the control unit is configured to convert a text message, received by the mobile device, into a voice signal, and output the converted voice signal through the one or more earphones, and wherein the control unit is further configured to detect a voice of the user, convert the detected voice of the user into text information, and control the mobile device to transmit a text message including the converted text information. The control unit is configured to output, based on a direction change while the vehicle is navigated, an audio signal indicating the direction change and vibration through either one of the one or more earphones attached to the user, which correspond to a route of the vehicle changed at the specific point. The main body is not located in the vehicle, and wherein the control unit is configured to control a state of the is vehicle based on a distance between the vehicle and the main body. The first detecting unit is further configured to sense a biometric signal of the user, and wherein the control unit is configured to identify the biometric signal of the user, determine, based on the biometric signal of the user, that the user is drowsy while the vehicle is operating, and output, based on the determination that the user is drowsy while the vehicle is operating, preset white noise through the one or more earphones.

In general, one innovative aspect of the subject matter described in this specification can be embodied in an ear set device including in methods that include detecting whether one or more earphones of an ear set device are attached to a user; detecting whether the ear set device is located within a preset vehicle; detecting whether the vehicle is operating; determining that the user requires information related to an operation of the vehicle; and receiving, in response to determining that the user requires the information related to the operation of the vehicle, the information related to the operation of the vehicle from the vehicle, and outputting, through the one or more earphones, a response signal corresponding to the received information, where the response signal is vibration or an audio signal.

The foregoing and other embodiments can each optionally include one or more of the following features, alone or in combination. In particular, one embodiment includes all the following features in combination. The methods include detecting whether a passenger other than the user is present within the vehicle; to detecting whether an preset event occurs in the vehicle; and outputting, based on a determination that the passenger other than the user is detected in the vehicle and a determination that the preset event has occurred in the vehicle, the response signal related to the preset event through either one of an audio output device provided in the vehicle or the one or more earphones, wherein the audio output is device is configured not to output the response signal related to the preset event while the response signal related to the preset event is output through the one or more earphones.

The details of one or more examples of the subject matter described in this specification are set forth in the accompanying drawings and the description below. Other potential features, aspects, and advantages of the subject matter will become apparent from the description, the drawings, and the claim.

BRIEF DESCRIPTION OF THE DRAWINGS

FIG. 17 is a flowchart illustrating an operational process in which an ear set device determines a path for outputting an audio signal related to a generated event when a passenger together with a user within a vehicle is asleep.

DETAILED DESCRIPTION

Ear set devices may be devices including a wearable device. For example, the ear set device may be worn on a user's head and may be able to output an audio signal to at least one of both ears of the user, such as a head set, a Bluetooth ear phone, a head mounted display (HMD) device, a smart glass, and the like, Referring to FIGS. 1A and 1B, FIG. 1A is a diagram illustrating an ear set device, and FIG. 1B is a diagram illustrating an example of an ear set device.

Figure 1A:
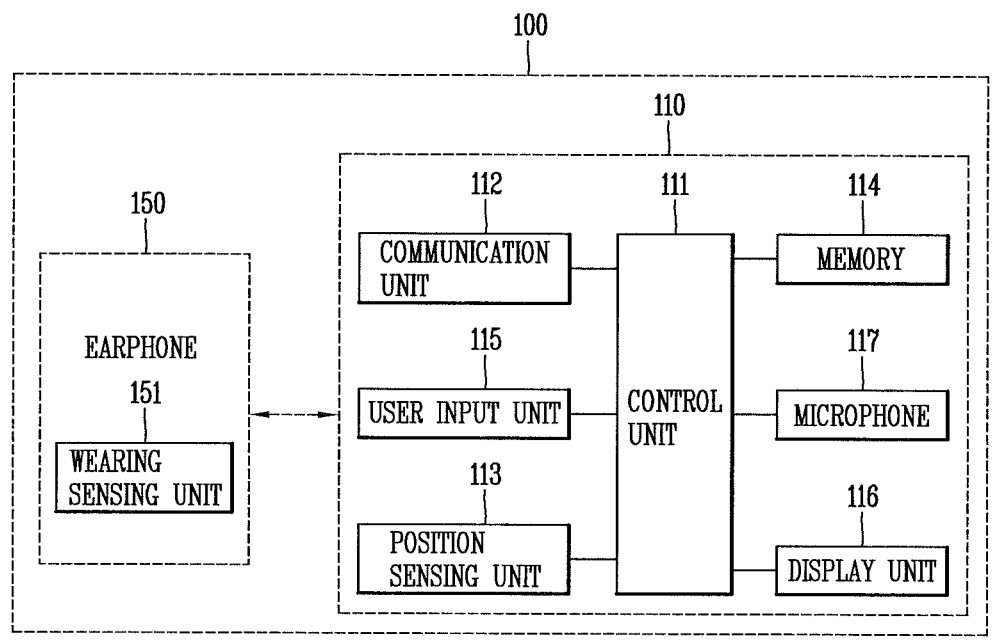
FIG. 1A is a block diagram illustrating an example ear set device.
Figure 1B:
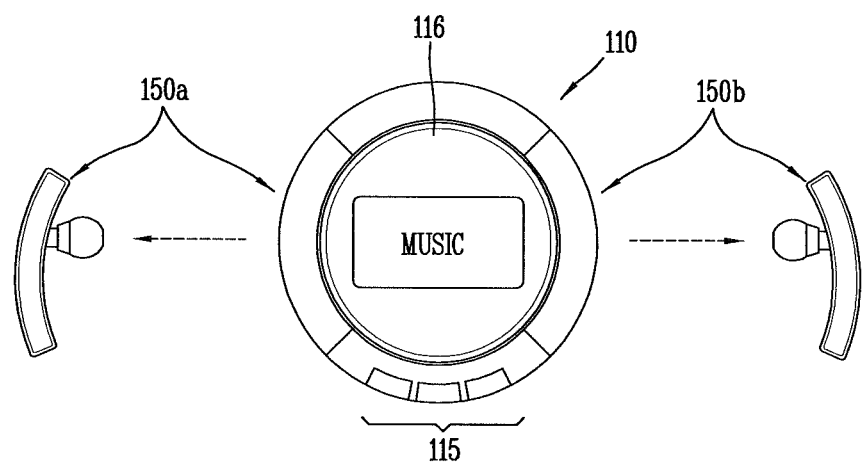
FIG. 1B is a diagram illustrating an example ear set device.

Referring to FIG. 1A, the ear set device 100 may include a main body 110 and an earphone 150 connected to the main body 110. The earphone 150 may be connected to the main body 110 wirelessly or wiredly, and may output audio data transmitted from the main body 110 as an audio signal according to a control signal input from the main body 110 or output vibration under the control of the main body 110.

The main body 110 may include a control unit 111, a communication unit 112 connected to the control unit 111, a position sensing unit 113, a memory 114, and a microphone 117, and may further include a user input unit and a display unit 116. It is understood that implementing all of the illustrated components is not a requirement, and the ear set device 100 may include greater or fewer components.

In detail, among the components, the communication unit 112 may include one or more modules enabling wireless communication between the earphone 150 and the main body 110 or between a preset external server or various external devices and the main body 110. For example, such a module may include a short-range communication module or a wireless Internet module.

The wireless Internet module refers to a module for a wireless Internet connection and may be installed in the main body 110 or may be provided outside of the main body 110.

The wireless Internet module may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

The short-range communication module is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

In some implementations, the external device may be a smart device (for example, a smartphone) or a wearable device (for example, a smart watch) that may exchange data with the ear set device 100. Also, the external device may be is various mobile devices provided within a vehicle, for example, a device such as a navigation device. Also, the external device may be a control device of a vehicle controlling various functions that can be executable in a vehicle.

In such a case, the main body 110 of the ear set device 100 may receive information related an event generated in a corresponding device from a device such as the smartphone through the communication unit 112. Also, the main body 110 may receive information related to an operation of a vehicle from a navigation device or a control device of the vehicle through the communication unit 112. Also, the main body 110 may be wirelessly connected to a preset external server through the communication unit 112, and may receive various types of information from the connected server.

Meanwhile, the communication unit 112 may include a radio frequency (RF) module for transmitting key information to the vehicle according to a wireless data transmission scheme required by a preset vehicle. In such a case, the control unit 111 may transmit key information for releasing a locked state of the vehicle or changing a state of the vehicle to a locked state through the communication unit 112, through the wireless communication module.

Meanwhile, the position sensing unit 113 may sense a current position of the ear set device 100. For example, the position sensing unit 113 may sense whether the main body 110 is within the preset vehicle or whether the main body 110 is within a predetermined distance from the vehicle if the main body 110 is outside of the vehicle.

For example, the position sensing unit 113 may sense whether a preset external device, for example, a control device of a specific vehicle, is within a preset distance, and may sense whether the ear set device 100 is within the specific vehicle or within a predetermine distance from the specific vehicle according to the sensing result. In a case in which the control device of the specific vehicle is sensed within the preset distance according to the sensing result, the position sensing unit 113 calculates a distance between the control device of the specific vehicle and the main body 110 of the ear set device 100, and sense whether the ear set device 100 is within the specific vehicle according to the calculated distance.

The memory 114 is typically implemented to store data to support various functions or features of the ear set device 100. For instance, the memory 114 may be configured to store application programs executed in the ear set device 100, data or instructions for operations of the ear set device 100, and the like. Some of these application programs may be downloaded from an external server via wireless communication. Other application programs may be installed within the ear set device 100 at time of manufacturing or shipping, which is typically the case for basic functions of the ear set device 100 (for example, a function of outputting information stored in the main body 110 or various types of information received by the main body 110 through the earphone 150, and the like). It is common for application programs to be stored in the memory 114, installed in the ear set device 100, and executed by the control unit 111 to perform an operation (or function) for the ear set device 100.

The memory 114 may include one or more types of storage mediums including a flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The ear set device 100 may also be operated in relation to a network storage device that performs the storage function of the memory 114 over a network, such as the Internet.

Meanwhile, the microphone 117 may detect an audio signal outside of the ear set device 100, and process the detected audio signal into electrical audio data. The processed audio data may be variously utilized according to a function (or an executed application program) being performed in the ear set device 100.

For example, the control unit 111 may receive an audio signal around the user who wears the ear set device 100 through the microphone 117. The control unit 111 may detect noise from the received audio signal, and attenuate the detected noise. Or, the control unit 111 may detect a voice component from the received eternal audio signal and increase an output gain of the detected voice component so that a voice signal included in the audio signal around the user may be clearly delivered to the user.

Also, the control unit 111 may detect whether an external audio signal received from the microphone 117 includes whether noise corresponding to a preset emergency situation. In a case in which the external audio signal includes noise corresponding to the emergency situation, the control unit 111 may increase an output gain of the noise component corresponding to the emergency situation, and output the same. In such a case, the earphone 150 may clearly output the noise component corresponding to the emergency situation, and thus, the user may more clearly recognize the occurrence of the emergency situation.

Meanwhile, the control unit 111 may control a general operation of the ear set device 100, in addition to an operation related to an application program or an application stored in the memory 114. The control unit 111 may provide or process information or functions appropriate for a user by processing signals, data, information, and the like, which are input or output by the various components described above, or drive an application programs stored in the memory 114 to provide appropriate information or function to the user.

Also, in order to drive an application program or an application stored in the memory 114, the control unit 111 may control at least some of the components described above together with FIG. 1A. In addition, in order to drive the application program, the control unit 111 may combine at least two or more of the components included in the ear set device 100 to operate the same.

Meanwhile, the control unit 111 of the ear set device 100 may output various types of information related to a vehicle in which the user is currently present, through the earphone 150. In some implementations, the information related to the vehicle may be received from a preset providing unit. The information related to the vehicle may be information related to an operation of the vehicle, and the providing unit may be a vehicle control device controlling various functions that may be executable in the vehicle, a navigation device provided in the vehicle, a smartphone of the user, or a specific preset external server.

For example, the control unit 111 may sense a position of the ear set device 100 in real time or at a preset predetermined time. In a case in which the ear set device 100 is within the preset vehicle according to the sensing result, various types of information related to the vehicle may be received from the preset providing unit, and the received information may be output through the earphone. In some implementations, the control unit 111 may output the received information as an audio signal or cause vibration corresponding to the audio signal to be output.

In some implementations, in a case in which the earphone 150 is in plurality, the control unit 111 may cause the vibration or an audio signal to be output through any one of the earphones 150. For example, in a case in which the user wears earphones (a first earphone and a second earphone) on the left ear and the right ear of the user, respectively, the control unit 111 may cause vibration or an audio signal to be output to only any one of the first earphone and the second earphone.

That is, in a case in which vehicle operation information to be output is "turn to the left direction", the control unit 111 may output the vibration or audio signal only to the first earphone won on the user's left ear among the earphones. Thus, the user may be provided with the route information through the audio signal or vibration even when the user does not check navigation information with naked eyes, and may recognize route information of the vehicle by intuition on the basis of the audio signal or vibration sensed only any one ear.

Meanwhile, in a case in which a current location is not within the vehicle according to the result of detecting a current location, the control unit 111 may detect whether there is a preset vehicle from the current location of the ear set device 100. Various functions related to the vehicle may be executed according to a user selection according the detection result. That is, for example, in a case in which the vehicle is within a preset distance from the position of the ear set device 100, the control unit 111 may release a locked state of the vehicle or switch a state of the vehicle to a locked state on the basis of a user request. In some implementations, the user request may be made by a user's voice or user input applied to at least one key provided in the ear set device 100.

Meanwhile, the ear set device 100 may further include a display unit 116 for displaying (outputting) information processed in the ear set device 100. For example, the display device 116 may display execution screen information of an application program driven in the ear set device 100 or user interface (UI) or graphic user interface (GUI) information according to such execution screen information. In some implementations, the display unit 116 may be implemented in the form of a touch screen including a touch sensor sensing a touch applied to the display unit 116 such that a control command may be received according to a touch scheme. When a touch is applied to the display unit 116 using this, the touch sensor may sense the touch and the control unit 111 may generate a control command corresponding to the touch on the basis of the sensed touch.

The user input unit 115 is a component that permits input by a user. Such user input may enable the control unit 111 to control operation of the ear set device 100. The user input unit 115 may include one or more of a mechanical input element (for example, a key, a button located on a front and/or rear surface or a side surface of the ear set device 100, a dome switch, a jog wheel, a jog switch, and the like), or a touch-sensitive input, among others.

As one example, the touch-sensitive input may be a virtual key or a soft key, which is displayed on a touch screen through software processing, or a touch key which is located on the ear set device at a location that is other than the touch screen. On the other hand, the virtual key or the visual key may be displayed on the touch screen in various shapes, for example, graphic, text, icon, video, or a combination thereof.

Meanwhile, at least one of the earphones 150 may be included in the ear set device 100. For example, a pair of earphones 150 may be included such that the earphones may be worn on the user's left ear and right ear, respectively. In such a case, the control unit 111 may cause different audio signals to be output to the respective earphones 150.

Meanwhile, the earphone 150 may include a wearing sensing unit 151. For example, the wearing sensing unit 151 may sense whether the earphone 150 is worn on the user's body, that is, on the user's ear, and may be implemented in the form including at least one sensor such as a contact sensor or a proximity sensor. In such a case, the wearing sensing unit 151 may transmit a sensing result from the is at least one sensor to the control unit 111, and thus, the control unit 111 may detect whether the user wears the earphone 150 or not.

Meanwhile, the earphone 150 may further include a vibration module. For example, the vibration module may include a haptic module or a vibrator to generate a vibration effect or various tactile effects. Strength and a pattern of vibrations generated by the vibration module may be controlled according to a user selection or according to a setting of the control unit 111.

Besides vibration, the vibration module can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

Also, the earphone 150 may include a wireless module for wireless connection with the main body 110. In such a case, the earphone 150 may be wirelessly connected to the main body 110 through the wireless module, and may receive a wireless signal transmitted from the main body 110.

FIG. 1B is a diagram illustrating an example of an ear set device 100.

Referring to FIG. 1B, the ear set device 100 may include a main body 110 and ear phones 150a and 150b that may be physically coupled to the main body 110 or separated from the main body 110. That is, in FIG. 1B, when the earphones 150a and 150b are not in use, the earphones 150a and 150b may be received in receiving spaces formed on both side surfaces of a case forming the main body 110. Also, at least one of the earphones 150a and 150b received in the receiving spaces may be separated.

As illustrated in FIG. 1B, the earphones 150a and 150b may be used in a is state of being physically separated from the main body 110. In such a case, various types of audio data transmitted from the main body 110 may be transmitted, in the form of a wireless signal, to at least one of the earphones 150a and 150b, and at least one of the earphones 150a and 150b which has received the signal transmitted from the main body 110 may output an audio signal corresponding to the transmitted signal. Also, at least one of the earphones 150a and 150b may output various tactile effects or a vibration effect according to a control signal transmitted from the control unit 111.

Figure 2A:
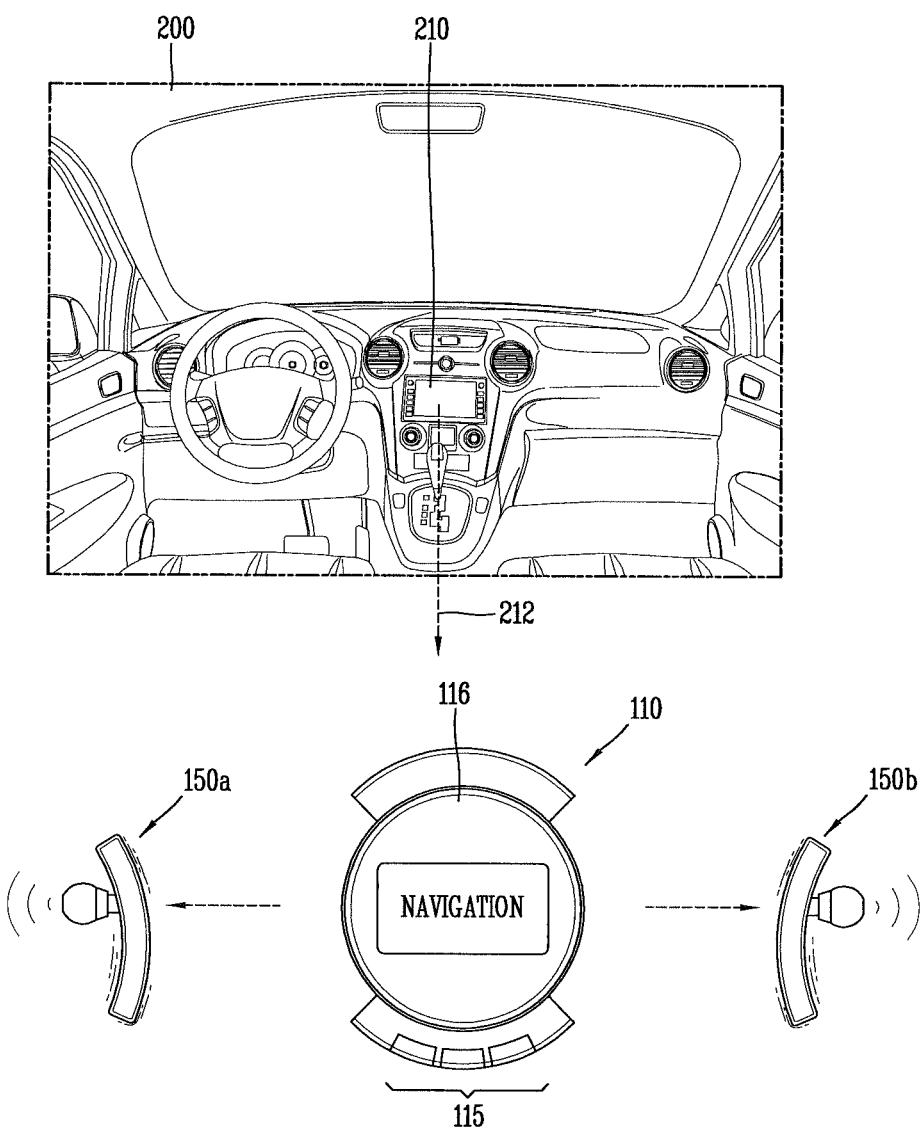
FIG. 2A is a diagram illustrating that an example ear set device receives information related to an operation of a vehicle and outputs the received information.

FIG. 2A is a diagram illustrating an example in which an ear set device 100 receives information related to an operation of a vehicle and outputs the received information.

For example, when a user, who wears the ear set device 100, gets in a preset vehicle 200, the ear set device 100 may sense whether the user wears the earphone 150. Also, when the user, wearing the earphones 150 gets in the vehicle 200, the user may receive various types of information related to the vehicle from a preset information providing unit.

For example, as illustrated in FIG. 2A, a control unit 111 of the ear set device 100 may receive (212) information related to an operation of the vehicle 200 from a navigation device 210 of the vehicle 200. In such a case, the control unit 111 may generate audio data according to the received information, and transmit the generated audio data to at least one of the earphones 150a and 150b. Then, the audio data may be output through at least one of the earphones 150a and 150b. In a case in which operation information of the vehicle 200 is output, the control unit 111 may display on the display unit 115 as illustrated in FIG. 2A.

Meanwhile, the control unit 111 may transmit a control signal for generating a vibration effect to at least one of the earphones 150a and 150b. Such a vibration effect may create a synergy effect together with the output vehicle operation information. For example, on the basis of the vehicle operation information received from the navigation device 210, before the vehicle reaches a specific location, for example, a crossroad, at which a route of the vehicle is changed, the control unit 111 may output an audio signal related to the specific location through at least one of the earphones 150a and 150b.

In a case in which the vehicle arrives at the specific location according to driving, the control unit 111 may control any one of the earphones 150a and 150b, which corresponds to the route of the vehicle changed at the specific location to output a preset vibration effect. Accordingly, in the ear set device 100, since the vibration effect, as well as the audio signal, is output from any one of the earphones worn on the user's left ear or the right ear corresponding to the changed route of the vehicle at a location such as a crossroad, the user may recognize the route of the vehicle changed at the crossroad, or the like, by intuition.

Figure 2B:
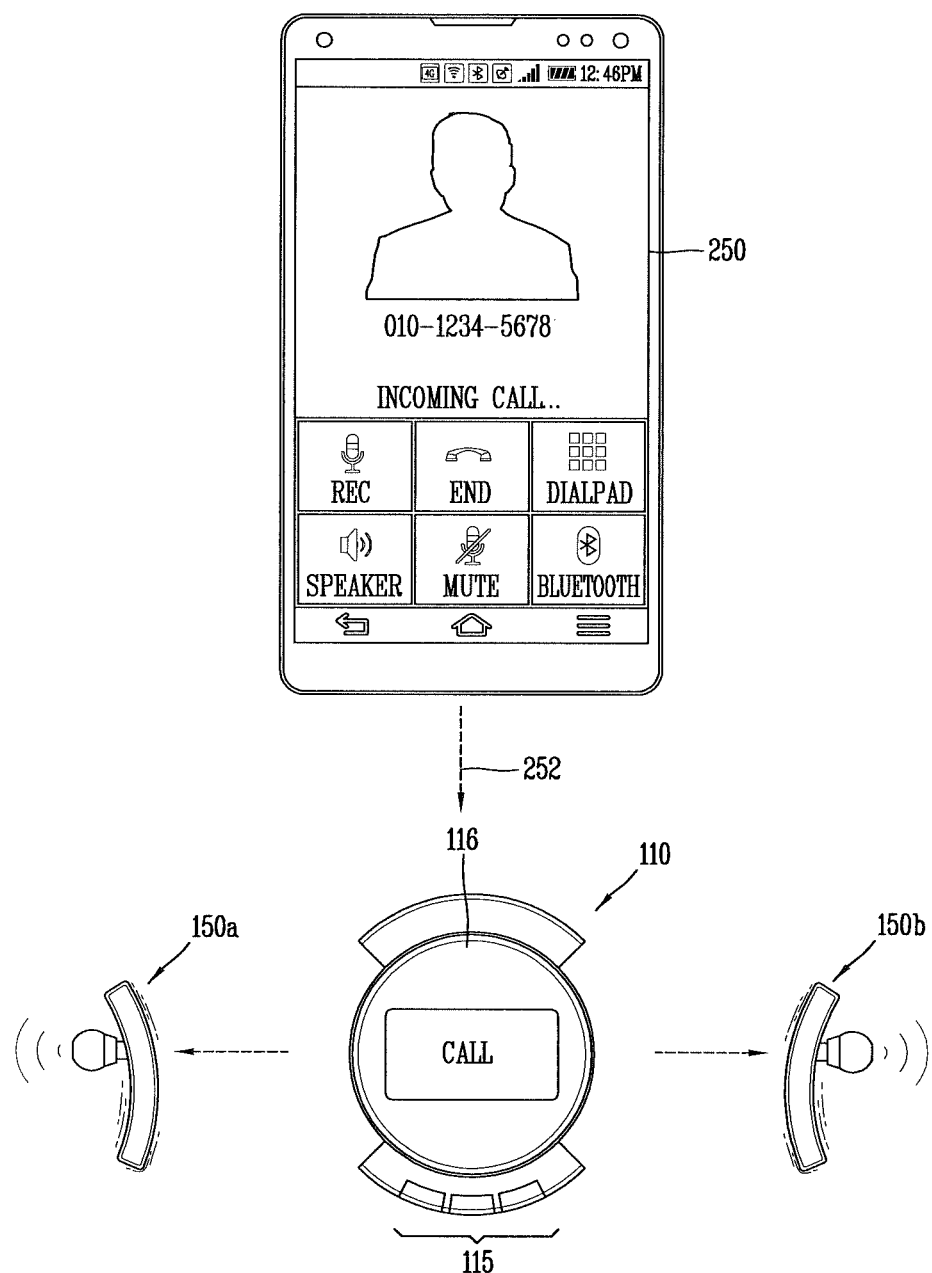
FIG. 2B is a diagram illustrating that an example an ear set device outputs information related to an event which has occurred in another device.

Meanwhile, similar to the connection to the navigation device 210 of the vehicle in FIG. 2A, the ear set device 100 may also be connected to various external devices. Such external devices may be a device such as a smartphone of the user, or the like. FIG. 2B is a diagram illustrating an example in which the ear set device outputs information related to an event which has occurred in a specific device when the ear set device is connected to the smartphone of the user.

For example, when the user in a state of wearing the earphone 150 gets in a vehicle, the control unit 111 of the ear set device 100 may be wirelessly connected to the smartphone of the user. In such a case, the control unit 111 may sense various events generated in the smartphone 250.

In some implementations, the event may occur in various cases. For example, in a case in which a call is terminated to the smartphone 250 or in a case in which a message is received by the smartphone 250, the control unit 111 may detect that an event has occurred. That is, as illustrated in FIG. 2B, when a call is terminated, the control unit 111 may detect a call termination event (or a call incoming event) of the smartphone 250 and output a preset audio signal or a vibration effect corresponding to the event through at least one of the earphones 150a and 150b. Also, the control unit 111 may perform various functions related to the event generated in the smartphone 250 according to a user request.

For example, the various functions may include a function of outputting information related to the terminated call (or incoming call) through the earphone. That is, the control unit 111 may receive audio data received from a counterpart mobile device of the terminated call, from the smartphone 250 and output to at least one of the earphones 150a and 150b. Also, the control unit 111 may receive a user's voice through the microphone 117 and transmits the same to the smartphone 250 such that the counterpart of the call termination and the user may perform call communication.

Meanwhile, in a case in which a message is received, the control unit 111 of the ear set device 100 may output contents related to the message through at least one of the earphones 150a and 150b. For example, the control unit 111 may convert the received message into a voice signal (for example, text to speech (TTS) function0, and output the converted voice signal through any one of the earphones 150a and 150b.

Meanwhile, in the above descriptions, only the case in which a call is terminated is described as an event generated in the smartphone 250, but the present disclosure is not limited thereto and the opposite case may also be an event generated in the smartphone 250. For example, when the user executes a specific function in the smartphone 250, the control unit 111 may detect the execution of the specific function as an event. That is, for example, in a case in which the user executes a message creation function for sending a message in the smartphone 250 or in a case in which the user executes a related function to send a call, the control unit 111 may detect the execution of the function as an event generated in the smartphone 250. The control unit 111 may convert a voice input from the user into text (text to speech (TTS)) and transmit the same to the smartphone 250 or may transmit a user's voice signal to the smartphone 250. These various functions of the smartphone 250 may be executed according to a user's voice signal or a user input with respect to keys provided in the user input unit 115 of the ear set device 100.

Figure 3:
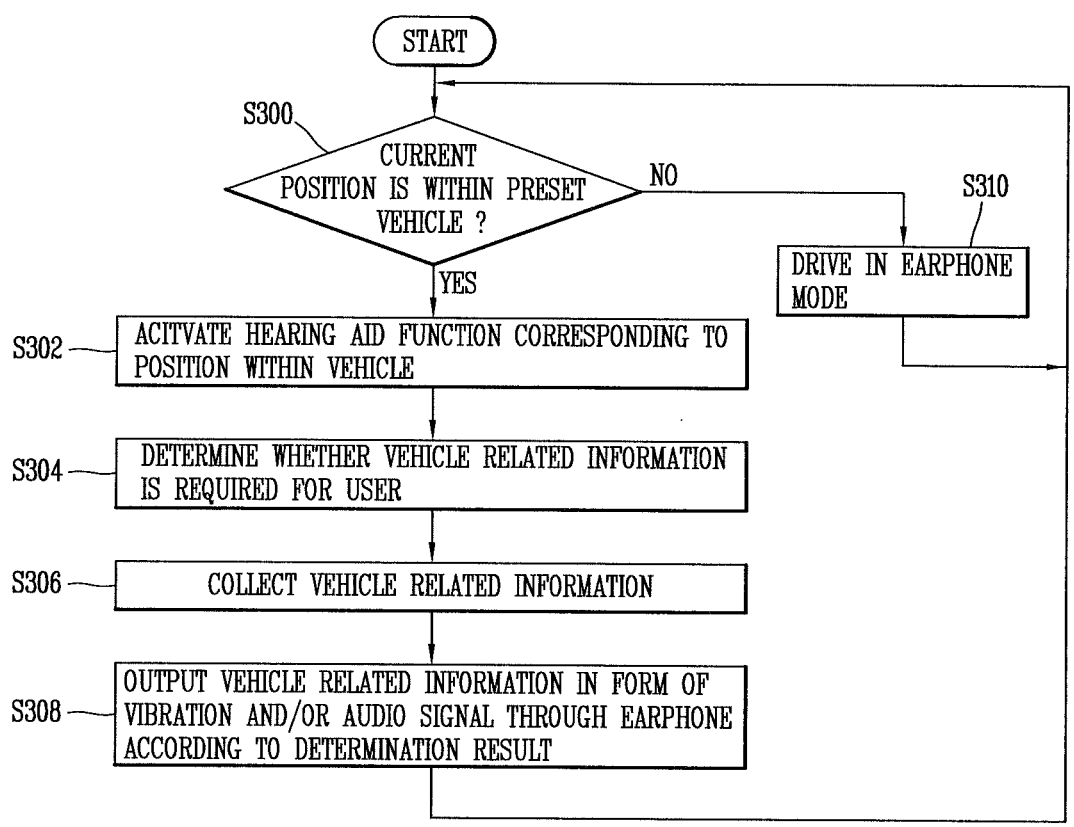
FIG. 3 is a flowchart illustrating an example operational process in which an ear set device receives information related to an operation of a vehicle and outputs the received information through an earphone.

FIG. 3 is a flowchart illustrating an operational process in which an ear set device receives information related to an operation of a vehicle and outputs the received information through an earphone.

Referring to FIG. 3, when the user wears the earphone 150, the control unit 111 of the ear set device 100 may sense the user's wearing of the ear set device 100. The control unit 111 of the ear set device 100 may sense a current position on the basis of a sensing result of the position sensing unit 113. For example, the control unit 111 may sense whether the ear set device 100 is within a preset vehicle on the basis of the preset vehicle (S300). For example, the position sensing unit 113 may sense whether the vehicle is within a predetermined distance from the ear set device 100. When the vehicle is sensed the position sensing unit 113 may calculate a distance between the vehicle and the ear set device 100 and determine whether the ear set device 100 is currently positioned within the preset vehicle on the basis of the calculated distance.

If the ear set device 100 is not positioned within the vehicle according to the sensing result in step S300, the control unit 111 may drive the ear set device 100 in an earphone operation mode. That is, similar to a general earphone device, the control unit 111 may output audio data such as sound source data provided from the main body 110 through the earphone 150.

However, even when the ear set device 100 is driven in the earphone operation mode, the ear set device 100 may be driven in a different mode according to a user request according to the distance to the preset vehicle. In some implementations, in a case in which the preset vehicle is not sensed according to the sensing result from the position sensing unit 113, or in a case in which the preset vehicle is sensed but a distance to the vehicle is equal to or longer than a preset distance, the ear set device 100 may operate in a vehicle control mode in which a state of the vehicle may be controlled according to the distance to the vehicle and a user request in the state in which the ear set device 100 operates in the earphone operation mode. The vehicle control mode may be an operation mode in which a locked state of the vehicle is released or a state of the vehicle is switched to a locked state. Hereinafter, an operational process of the ear set device when the ear set device operates in the earphone mode will be described in detail with reference to FIG. 7 hereinafter.

Meanwhile, in a case in which the ear set device 100, for example, the main body 110, is sensed to be present within a vehicle, the control unit 111 may activate a hearing aid function corresponding to a current position (S302). That is, as described above, when the user, who wears the ear set device 100 (for example, the user wears the earphone 150), gets in the vehicle, the control unit 111 may sense that in step S300, and may activate the preset hearing aid function corresponding to the interior of the vehicle in step S302.

Meanwhile, whether the user gets in the vehicle may be determined according to various methods in step S302. For example, when the user drives the vehicle (for example, when the vehicle is started, and the like) in a state of wearing the earphone 150, or when the user executes a specific function (for example, a navigation function, or the like) provided in the vehicle, the control unit 111 may determine that the user has got in the vehicle.

Meanwhile, in step S302, the hearing aid function may refer to a function of attenuating noise sensed from the outside and amplifying a specific sound component to a predetermined level or higher. The preset hearing aid function corresponding to the interior of the vehicle may refer to a function of previously setting the attenuated noise, a level of attenuating the noise and/or the amplified specific sound component and an amplification level of the specific sound component such that it is appropriate for the interior of the vehicle.

That is, the preset hearing aid function corresponding to the interior of the vehicle may include a function of attenuating various types of noise that may occur within the vehicle to a predetermined level or higher. In some implementations, information regarding various types of noise that may occur within the vehicle may be information which has been stored in the memory 114 or which has been stored in a preset external server (for example, a cloud server). For example, the previously stored information regarding various types of noise may include characteristic noise (for example, a characteristic sound of an engine, an electronic sound, and the like) generated in the preset vehicle. In such a case, the control unit 111 may attenuate noise included in the audio signal sensed by the microphone 117 on the basis of the previously stored noise information, and amplify a specific sound component, for example, a sound component such as a human's voice, or the like, to a preset level and output the amplified sound component.

Meanwhile, the hearing aid function is not limited to the attenuation of noise corresponding to the previously stored information. For example, the hearing aid function may detect a specific sound component having a level higher than a preset level from an audio signal received from the outside, and attenuate the detected sound component. For example, the specific sound component may be stationary noise having a level equal to or higher than a predetermined level which is continuously or periodically generated. In such a case, the control unit 111 may perform a process of analyzing a result of detecting an external audio signal through the microphone 117, and attenuating the stationary noise detected from the analysis result.

Meanwhile, in step S302, when the hearing aid function corresponding to the interior of the vehicle is activated, the control unit 111 may determine whether information related to the current vehicle is required for the user (S304). For example, in a case in which the user who wears the earphone 150 is a driver of the vehicle, the control unit 111 may determine that the user requires information related to the vehicle.

Then, the control unit 111 may determine whether the user who wears the earphone 150 is a drive of the vehicle. For example, when the current user of the ear set device 100 has been previously registered as a driver of the vehicle, the control unit 111 may determine that the user who wears the earphone 150 is a driver of the vehicle. Or, in a case in which a locked state of the preset vehicle is released by the user and the user who wears the earphone 150 gets in the vehicle, the control unit 111 may determine that the user is a driver of the vehicle. Or, in a case in which a user request is received, the control unit 111 may determine that the user requires information related to the vehicle. In some implementations, the user request may be made through various methods such as input of a voice signal of the user, a preset key input, and the like.

Meanwhile, in a case in which the user requires information related to the vehicle according to the determination result in step S304, the control unit 111 may collect various types of information related to the vehicle (S306). In some implementations, the control unit 111 may collect diverse information. For example, information related to a current state of the vehicle, that is, a state of currently remaining fuel, a voltage of a battery, and the like, may be collected by the control unit 111. In such a case, the control unit 111 may also collect information related to an operation-available distance, and the like, according to the current state of the vehicle, as well as the current state of the vehicle.

Meanwhile, the information related to the vehicle may be information related to an operation of the vehicle. In such a case, the control unit 111 may collect the current position of the vehicle and information regarding a set route to a specific destination, and may also collect information such as a preset point of interest (POI). In some implementations, the collected navigation information may include various types of traffic information such as an area in which traffic congestion occurs or an area in which an accident occurs, and the like, in the route to the set specific destination.

Also, the information related to the vehicle may include information regarding an environment in the vicinity of the vehicle. For example, the control unit 111 may collect information related to a temperature outside of the vehicle or information related to various weather conditions, that is, whether it rains or whether it snows.

The control unit 111 may receive such pieces of vehicle related information from various information providing units. For example, in the preset vehicle, the control unit 111 may be connected to the control unit 111 controlling various functions that may be executed in the vehicle, and may receive pieces of the vehicle related information from the control unit 111. Or, the control unit 111 may receive pieces of the vehicle related information from a mobile device of the user, a navigation device provided within the vehicle, and the like.

Or, the ear set device 100 may receive information related to an operation of the vehicle or information regarding an environment in the vicinity of the vehicle directly from a preset external server, for example, from an external server providing traffic information or weather information. For example, the control unit 111 may receive weather information of an area corresponding to a current location of the vehicle from the server providing the weather information. Or, the control unit 111 may receive traffic condition information corresponding to a current location of the vehicle from the server providing the traffic information. In some implementations, the location of the vehicle may be obtained through the navigation device provided in the vehicle or the vehicle control unit of the vehicle, or may be obtained through a mobile device of the user.

Meanwhile, when various types of information related to the vehicle are collected in step S306, the control unit 111 may output the collected vehicle related information through the earphone 150 (S308). In some implementations, the vehicle related information may be output in various forms.

For example, the control unit 111 may output the vehicle related information as a voice signal. In such a case, when driving of the vehicle is detected, the control unit 111 may output an amount of fuel currently remaining in the vehicle, a voltage of the battery, a distance to which the vehicle may operate according to the current state of the vehicle, and the like, as a voice signal on the basis of the collected vehicle related information. Also, the control unit 111 may output information regarding an environment in the vicinity of the vehicle, that is, a temperature or weather condition, and the like, as a voice signal through the earphone 150.

Meanwhile, in a case in which the vehicle starts to operate, the control unit 111 may output information related to the operation of the vehicle through the earphone 150. For example, in a case in which a specific destination is set, the control unit 111 may output information regarding the currently set destination of the vehicle and a route thereof as a voice signal through the earphone 150. In a case in which the vehicle starts to operate, that is, in a case in which the vehicle starts to move, operation information of the vehicle corresponding to the location of the vehicle that moves may be output in the form of a voice signal through the earphone 150 according to the operation of the vehicle. In some implementations, the operation information of the vehicle may be information received from the control unit of the vehicle, the navigation device, the mobile device of the user, and the like, as described above in step S306. The voice signal output in step S308 may be an audio signal obtained by attenuating noise and strengthening a frequency component of a specific audio signal according to a hearing aid function activated in step S302. Hereinafter, an operational process of attenuating noise and strengthening a frequency component by the activated hearing aid function in step S308 will be described in detail with reference to FIG. 4.

Meanwhile, the operation information of the vehicle may also be output in a form other than a voice signal. For example, the control unit 111 may provide operation information of the vehicle by using a vibration module provided in the earphone 150. In such a case, the control unit 111 may drive only any one of vibration modules provided in the earphones 150a and 150b to provide information related to a point where a driving direction of the vehicle is changed and information related to a changed driving direction.

That is, the control unit 111 may receive information regarding a current location of the vehicle in a route to a currently set destination through the vehicle control unit, the navigation device, or the mobile device of the user. In a case in which the vehicle approaches to be within a predetermined distance to a specific point at which the driving direction of the vehicle is changed at an angle equal to or greater than a predetermined angle in the route to the set destination, the control unit 111 may drive only any one vibration module of the earphones 150a and 150b on the basis of the changed driving direction. For example, in a case in which the route to the destination is changed to a rightward direction at the specific point, the control unit 111 may cause vibration to be output only to the earphone 150b worn on the user's right ear, among the earphones 150a and 150b. Also, conversely, in a case in which the route to the destination is changed to a leftward direction at the specific point, the control unit 111 may cause vibration to be output only to the earphone 150a worn on the user's left ear, among the earphones 150a and 150b.

Meanwhile, the ear set device 100 may not display operation information of the vehicle to the user through vibration only when a direction is required to be changed to the leftward direction or the rightward direction. That is, for example, the control unit 111 may display a case in which the vehicle is required to move forward or move back by causing the earphones 150a and 150b to simultaneously vibrate, and in such a case, when the vehicle moves forward or moves back, forms, vibration periods, or strengths of vibrations output from the earphones 150a and 150b may be different.

Also, in this manner, by differentiating at least one of the forms, periods, and strengths of vibrations generated in the earphones 150a and 150b, the control unit 111 may display information regarding an angle at which the vehicle is to be changed, when the direction of the vehicle is changed to the left or to the right.

Meanwhile, as described above, operation information of the vehicle may be provided to the user through the earphone 150 by using vibration or a voice signal. However, the control unit 111 may output both vibration and a voice signal together, rather than using only any one of vibration and the voice signal.

Also, the control unit 111 may output the voice signal and vibration with a slight time lag to obtain a higher synergy effect. For example, the control unit 111 may output information related to an operation of the vehicle as a voice signal and in some implementations, in a case in which the information related to the operation of the vehicle is information indicating that a driving direction of the vehicle is required to be changed, the control unit 111 may also output a vibration effect corresponding thereto. In such a case, the control unit may output such a vibration effect at a point in time at which a driving direction of the vehicle is required to be changed, that is, in a case in which a current location of the vehicle is adjacent to a specific point at which the driving direction of the vehicle is required to be changed, whereby the user may recognize the point in time at which the driving direction of the vehicle is required to be changed and the direction in which the vehicle is to be changed by intuition.

Meanwhile, after outputting the operation information of the vehicle, the control unit 111 may proceed to step S300 to continue to detect a current location of the vehicle. In a case in which a current position is not within the vehicle, the control unit 111 may proceed to step S310 and operate in the earphone operation mode.

However, when the current position is within the preset vehicle according to the detection result of step S300, the control unit 111 may proceed to step S302 and continue to maintain the currently activated hearing aid function. The control unit 111 may proceed to step S304 and determine whether the user requires vehicle related information. When it is determined that the user does not require vehicle related information in step S304, the control unit 111 may not provide vehicle related information such as operation information of the vehicle and a current condition of the vehicle to the user. For example, in a case in which the user requests stopping providing of the vehicle related information through a voice signal of the user, through a preset key input, or the like, the control unit 111 may determine that the user does not require vehicle related information any longer.

In a case in which the user does not require vehicle related information any longer, the control unit 111 may stop displaying the vehicle related information. Also, in a case in which the user requests stopping of providing the vehicle related information, the control unit 111 may determine that the user does not require the vehicle related information currently in step S304 until the user requests providing of vehicle related information again.

In such a case, the control unit 111 may proceed to step S300 again, continue to detect a current position, and perform follow-up steps according to the detection result.

Figure 4:
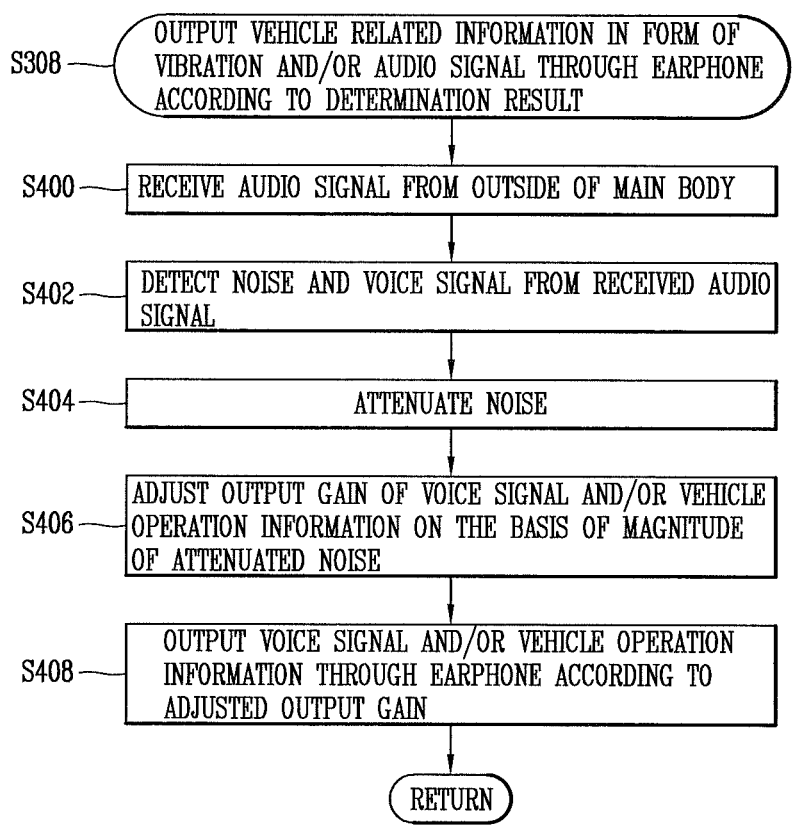
FIG. 4 is a flowchart illustrating an example operational process in which an ear set device attenuates noise and adjusts a gain a particular component according to an activated hearing aid function and outputs the same.

Meanwhile, as mentioned above, the audio signal output through the earphone 150 in step S308 is an audio signal in which noise is attenuated and a specific frequency component is strengthened according to the currently activated hearing aid function. FIG. 4 is a flowchart specifically illustrating an example of an operational process in which the ear set device attenuates noise and adjusts a gain of a specific component according to the currently activated hearing aid function.

Referring to FIG. 4, the control unit 111 of the ear set device may detect an external audio signal of the ear set device 100 through the microphone 117 (S400). The control unit 111 may analyze the sensed audio signal to detect a noise signal from the received audio signal (S402).

For example, the control unit 111 may detect various types of noise from various frequency components included in the sensed audio signal in step S402. For example, the control unit 111 may detect whether the sensed audio signal includes a frequency component corresponding to characteristic noise of the preset vehicle by using the memory 114 or previously stored noise information. Or, the control unit 111 may detect stationary noise continuously or periodically included in the detected audio signal. In a case in which stationary noise is detected, the control unit 111 may separate the detected stationary noise from the audio signal.

In some implementations, the stationary noise may refer to noise having a level equal to or higher than a preset level, which is continuously or repeatedly generated and changes in an amplitude, or the like, according to the passage of time by a level equal to or lower than a predetermined level. The stationary noise may include noise having a magnitude which is rarely varied over time, such as a sound of an engine or an activation sound of an air-conditioner, or the like.

Meanwhile, the control unit 111 may also detect a frequency component corresponding to a voice of a person, as well as noise in step S402. For example, the control unit 111 may detect a voice component of a person from the audio signal detected through the microphone 117 by using previously stored information related to a frequency component of a voice of a person. To this end, information regarding various algorithms for detecting a component corresponding to a voice signal from the audio signal may have been stored in the memory 114.

When a noise component according to the stationary noise or the preset noise information is detected in step S402, the control unit 111 may attenuated detected noise component (S404). In some implementations, attenuation of noise may include a process of mixing the frequency component for attenuating the detected noise component with the external audio signal component of the ear set device 100. Or, attenuation of noise may include a filtering process of limiting a gain of the frequency component of the noise component included in the received audio signal.

The control unit 111 may adjust the gain of the audio signal in which the noise is attenuated, according to a gain level set to correspond to the interior of the vehicle (S406). For example, in step S402, the control unit 111 may adjust an output gain of the voice component such that a magnitude of the detected voice component of a person is greater than a magnitude of the attenuated noise component by a level equal to or greater than a preset level. The control unit 111 may output the attenuated noise component and the voice component through the earphone according to the adjusted output gain (S408). Thus, the voice of the person greater than the noise component by a level equal to or greater than a preset level is output from the ear set device 100, the voice of the person may be more clearly delivered to the user.

Meanwhile, the gain level may be determined to be different according to positions of the ear set device 100. That is, the preset gain level in step S406, that is, the preset gain level (hereinafter, referred to as a "first gain level") in a case in which the ear set device 100 is within the vehicle, and a gain level when the ear set device 100 is driven in the earphone operation mode, that is, a preset gain level (hereinafter, referred to as a "second gain level") in a case in which the ear set device 100 is outside of the vehicle, may be different.

For example, the second gain level may be greater than the first gain level. This is because the user is present outside, rather than being present inside, such as the interior of the vehicle.

That is, the first gain level may be a gain level which was obtained through repeated experimentation results and set in advance such that the user (or the driver) may easily listen to a voice of a person next to the driver within the vehicle when the user is within the vehicle.

Meanwhile, the control unit 111 may output operation information of the vehicle by adjusting an output gain according to the preset gain level, as well as the voice signal. Thus, in a case in which operation information of the vehicle is output as a voice signal through the earphone 150, the control unit 111 may adjust an output gain such that a magnitude of the voice signal corresponding to the operation information of the vehicle is increased to be greater than a magnitude of the attenuated noise component by a level equal to or greater than a preset level. Thus, in the ear set device 100, since the voice component corresponding to the operation information of the vehicle, which is greater than the noise component by a level equal to or greater than a preset level, is output, the operation information of the vehicle may be more clearly provided to the user.

In some implementations, in step S408, the control unit 111 may cause only any one of the voice component of the person and the operation information of the vehicle to be output, or may cause the voice component of the person and the operation information of the vehicle to have different output gains. That is, for example, when the operation information of the vehicle is output, the control unit 111 may control the microphone 117 not to output the sensed voice component, or may output the operation information of the vehicle such that it is greater than the voice component.

Also, in a case in which the control unit 111 determines that noise within the vehicle is equal to or greater than a preset level according to a result of sensing noise, the control unit 111 may automatically change a scheme of providing operation information of the vehicle from a voice signal output scheme to a vibration output scheme. In such a case, the control unit 111 may deliver the operation information of the vehicle, that is, for example, navigation information, to the user using a vibration effect generated through a vibration module of the earphone 150.

Meanwhile, as described in the present disclosure, when the user is provided with various types of information related to an operation of the vehicle in a state in which the user wears the earphone 150 and gets in to be present within the vehicle, the information related to the operation of the vehicle or voice of other passengers within the vehicle may be clearly delivered to the user. However, in a situation in an event occurs outside of the vehicle, the event may not be delivered to the user due to a shielding effect due to the wearing of the earphone 150 or the user may recognize the event belatedly.

Figure 5:
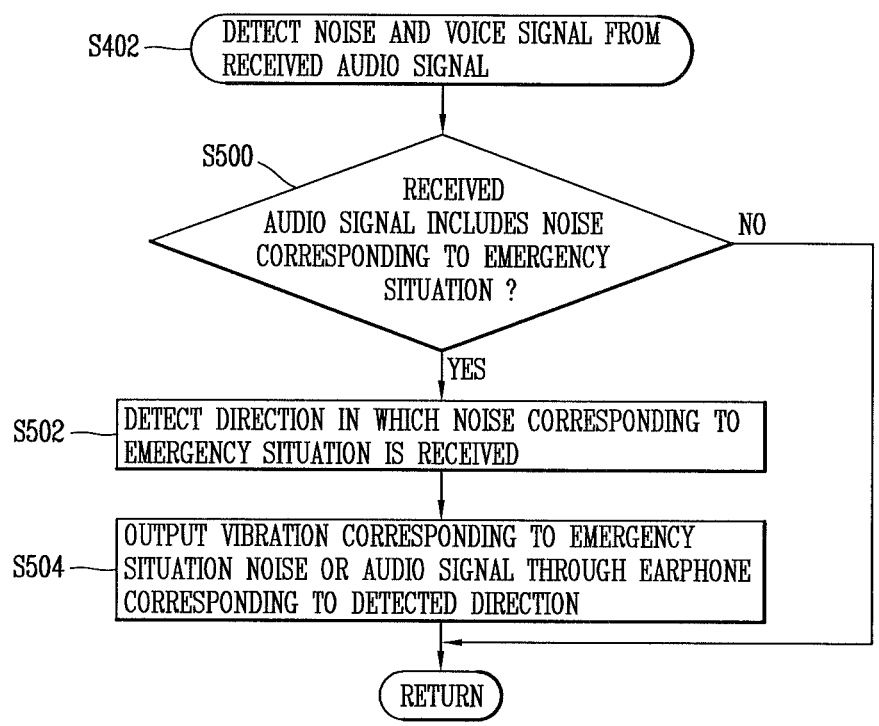
FIG. 5 is a flowchart illustrating an example operational process in which when noise corresponding to an emergency situation is sensed from the outside, an ear set device outputs a signal for indicating the sensed noise through an earphone.

Thus, in a case in which noise corresponding to an emergency situation is detected, the ear set device 100 may enable the user to immediately recognize the noise. To this end, when noise and a voice signal is detected from an audio signal detected in step S402, the ear set device 100 may detect whether noise corresponding to a preset emergency situation is included therein, and may output a preset vibration or audio signal according to the detection result. FIG. 5 illustrates an operational process of the ear set device in such a case.

Referring to FIG. 5, the control unit 111 of the ear set device 100 may detect whether a noise component corresponding to a preset emergency situation is included in an audio signal detected by the microphone 117 (S500). In some implementations, the noise component corresponding to the preset emergency situation may be a frequency component corresponding to a sound of a siren of a police car or an ambulance, a sound of explosion, or a sound of horn of a different vehicle. Information related to the noise component corresponding to the emergency situation may have been previously stored in the memory 114.

For example, in step S500, the control unit 111 may detect whether a noise component corresponding to an emergency situation is included in a frequency component of an audio signal detected through the microphone 117. In a case in which a noise component corresponding to the emergency situation is included in the frequency component according to the detection result of S500, the control unit 111 may detect a direction in which noise corresponding to the emergency situation is received (S502).

For example, the ear set device 100 may include a plurality of sensors for sensing noise having a level equal to or greater than a predetermined level, as well as the microphone 117. In such a case, the control unit 111 may detect sensors which have detected noise having a level equal to or greater than the predetermined level from the provided sensors, and may detect a direction in which the noise occurs on the basis of a sensor which has detected noise having the highest strength among the detected sensors. Or, the control unit 111 may be connected to the control unit of the vehicle and detect a direction in which noise having a level equal to or greater than the predetermined level occurs by using sensors provided in the vehicle. In some implementations, the noise having a level equal to or greater than the predetermined level may be noise corresponding to a noise component corresponding to the emergency situation, and in such a case, the control unit 111 may detect a direction in which the noise corresponding to the emergency situation (hereinafter, referred to as "emergency situation noise") occurs. In order to accurately detect the direction in which the emergency situation noise occurs, the control unit 111 may conduct experiment a plurality of times and use learned database generated on the basis of the conducted experiment, and the learned database may be a database stored in the memory 114.

For example, the ear set device 100 may have such sensors on a left side and a right side of the main body 110, or may have the sensors in the earphones 150*a* and 150*b* worn on both ears of the user. In such a case, the control unit may detect a direction in which noise corresponding to the emergency situation occurs by using the sensors provided on the left side and the right side of the main body or the sensor provided in the earphone 150*a* worn on the user's left ear and the sensor provided in the earphone 150*b* worn on the user's right ear. In a case in which noise corresponding to the emergency situation occurs in step S502, the control unit 111 may output a preset vibration or audio signal through the earphone corresponding to a direction in which generated noise is detected (S504). The vibration and noise output in step S504 may be different according to each of emergency situations. For example, strengths, or periods of vibration of a vibration corresponding to a sound of siren of an ambulance, a vibration corresponding to a sound of a siren of a police car, and a sound of a horn of a different vehicle may be different, and a vibration corresponding to a case such as explosion noise, or the like, may be short and have powerful strength and may be differentiated from the vibrations corresponding to noise according to emergency situations.

Also, the control unit 111 may control an output gain such that noise according to each of the emergency situations may is output as an audio signal having a predetermined magnitude. For example, in a case in which a magnitude of noise according to each of emergency situations is too small, the control unit 111 may amplify the noise to have a magnitude equal to or greater than a preset level (that is, a magnitude equal to or grater than a preset minimum value) and output the amplified noise. Conversely, in a case I which a magnitude of noise according to each of emergency situations is too large, the control unit 111 may amplify the noise to have magnitude equal to or smaller than a preset level (that is, a magnitude equal to or smaller than a preset maximum value) and output the amplified noise.

Meanwhile, as mentioned above, the ear set device 100 may detect an event generated by various devices within the vehicle and output information related to the sensed event through the earphone. To this end, when the user, who wears the earphone 150, gets in the vehicle, the control unit 111 may be connected to various devices within the vehicle, and may allow the user to be provided with various types of information through the earphone 150 according to a user selection.

Figure 6:
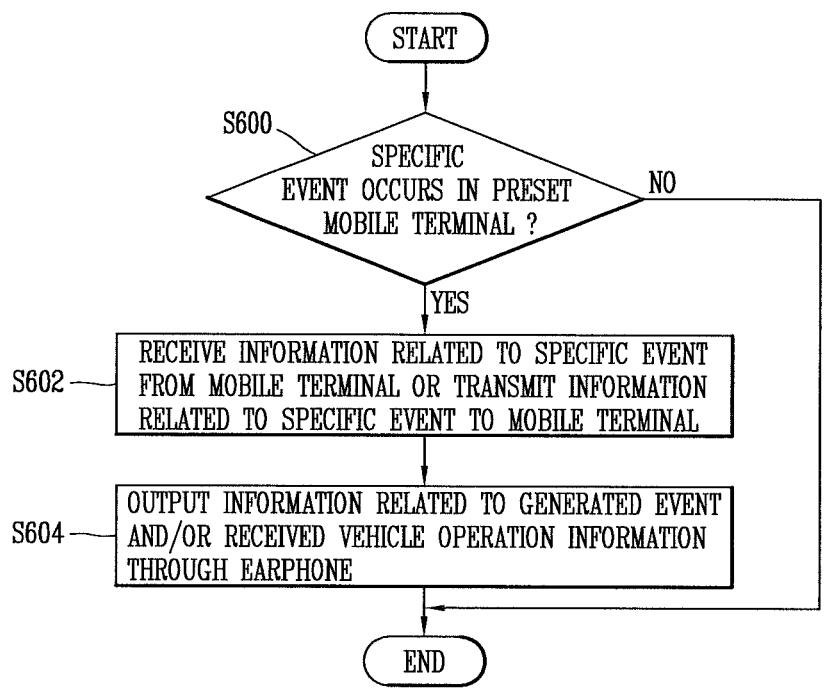
FIG. 6 is a flowchart illustrating an example operational process in which an ear set device outputs information related to an event which has occurred in another device, through an earphone.

In some implementations, a mobile device such as a smartphone of the user may also be included in the various devices within the vehicle, and FIG. 6 illustrates an operational process in which the ear set device 100 outputs information related to an event generated in the smartphone of the user through the earphone in such a case. In the following description, a case in which the user selects receiving information related to an event generated in the smartphone through the earphone 150 will be described as an example. However, unlike the descriptions of FIG. 6, the user may select that he or she will not receive information from the smartphone when an event occurs in the smartphone, or in a case in which connection to the smartphone is cut off in advance, the control unit 111 may continue to output only vehicle related information through the earphone, regardless of an event generated in the smartphone.

Referring to FIG. 6, the control unit 111 may detect whether a specific event has occurred in the preset mobile device among the devices positioned within the vehicle (S600). In some implementations, the preset mobile device may be a mobile device of the user who wears the earphone 150 of the ear set device 100. The specific event may include a situation in which a specific function is executed according to a user selection, such as execution of a function for sending a call or sending a message, as well as an event according to a passive situation generated in the mobile device, like termination of a call or reception of a message. That is, for example, when a call origination function is executed by the user or a function of creating a message is executed by the user, as well as that a call is terminated to the preset mobile device or a message is received by the preset mobile device, the control unit 111 of the ear set device 100 may detect the execution of the call origination function or the execution of the function of creating a message, as occurrence of the specific event.

When it is determined that the preset specific event occurs according to the determination result in step S600, the control unit 111 may receive information related to the specific event from the mobile device or may transmit the information related to the specific event to the mobile device (S602). For example, when it is assumed that the event is termination of a call or reception of a message, the control unit 111 may transmit information regarding the terminated call to the user, connect a call and receive a voice signal of a counterpart of the connected call from the mobile device according to a user selection in step S602. Or, the control unit 111 may receive information regarding contents of the received message from the mobile device.

Meanwhile, when information related to an event generated in the mobile device is received, the control unit 111 may output information related to the generated event and/or operation information of the vehicle through the earphone (S604). For example, when a call is terminated to the mobile device, the control unit 111 may output a voice signal of a counterpart of a connected call through the earphone 150. When a message is received by the mobile device, the control unit 111 may convert text contents of the received message into a voice signal (TTS function), and output the transformed voice signal through the earphone 150.

In step S604, when event information generated in the mobile device is output, even though there is operation information of the vehicle, the control unit 111 may not output the operation information of the vehicle. Or, the control unit 111 may output the operation information of the vehicle, the voice signal of the counterpart of the call or the TTS-converted voice signal such that output gains thereof are different. That is, in a case in which event related information generated in the mobile device is output through the earphone 150, the control unit 111 may cause the operation information of the vehicle not to be output, or may cause the voice signal of the counterpart of the call or the voice signal corresponding to the operation information of the vehicle to be output with strength smaller than that of the voice signal of the counterpart or that of the TTS-converted voice signal.

Meanwhile, when a call is originated according to a user selection, step S602 may be a process in which the control unit 111 transmits a control signal for connecting a call according to the originated call and a voice signal of the user to the mobile device or may be a process in which information regarding contents of a message to be created according to a user selection is transmitted to the mobile device. In such a case, the control unit 111 may receive a voice signal from the user, convert the received voice signal into text (STT function), and transmit the converted text data as contents of the message to be created to the mobile device.

Meanwhile, when the user is in a state of inputting a voice signal to the counterpart of the call or in a state of inputting contents of a message to be created according to a user selection, the control unit 111 may not output operation information of the vehicle. Or, the control unit 111 may reduce an output gain of the operation information of the vehicle to output the operation information of the vehicle. This is not to interfere with a call of the user when the user is performing call communication, and this is to prevent generation of an error in contents of a message to be created during the SST conversion process.

Meanwhile, the message may include various social network service (SNS) messages, as well as a short messaging service (SMS). Thus, the control unit 111 may immediately convert an SNS message received from the mobile device into TTS and output the same through the earphone 150, and convert a user's voice into STT and transmits the same as an SNS message through the mobile device to allow a plurality of users to make conversation using the SNS message.

Meanwhile, in the above, only the call termination, the call origination, and the message transmission and reception have been mentioned, but these are merely examples for the purposes of description, and an event that the ear set device 100 may sense in the mobile device is not limited thereto.

In the above, the operational process in a case in which the ear set device 100 is positioned within the vehicle has been described in detail with reference to the flowcharts.

Figure 7:
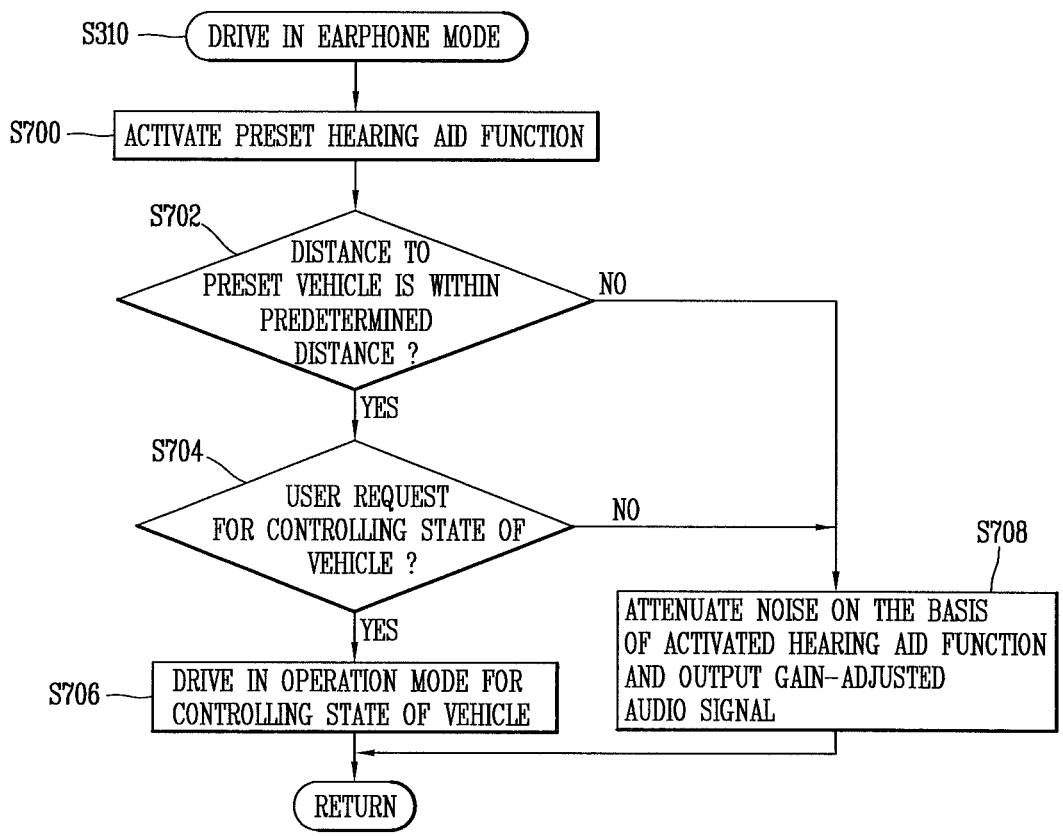
FIG. 7 is a flowchart illustrating an example process in which an ear set device operates in an earphone mode when a user is outside of a vehicle.

Hereinafter, an operational process in a case in which the ear set device 100 is positioned outside of the vehicle will be described in detail with reference to FIG. 7.

As described above, when the ear set device 100 is not within the vehicle according to a result of detecting a current position in step S300, the ear set device 100 may operate in an earphone operation mode. In a case in which the ear set device 100 operates in the earphone operation mode, the control unit 111 of the ear set device 100 may activate a preset hearing aid function corresponding to the current position, that is, corresponding to a state in which the ear set device 100 is positioned outside of the vehicle, and provide the corresponding hearing aid function (S700).

For example, such a hearing aid function may be a function of detecting an external noise level through the microphone 117, and attenuating the detected noise. Also, in a case in which a voice of a person is detected through the microphone 117, the hearing aid function may refer to a function of increasing an output gain of the detected voice component of the person by a level equal to or greater than a preset level compared with a gain level of the attenuated noise such that an audio signal of the voice component may be clearly output to the user. In some implementations, the preset level (second gain level) may be different from a preset gain level (first gain level) when the ear set device 100 is within the vehicle, and the second gain level may be greater than the first gain level. This is because, the user is not within an indoor area such as the interior of the vehicle, but is present outside of the vehicle.

In a state in which the hearing aid function is activated, the control unit 111 may output an audio signal input through a sound source reproducing device according to a user selection, through the earphone 150. In such a case, the audio signal may be adjusted in gain and output by the hearing aid function. That is, like a voice of a person, the control unit 111 may adjust an output gain of an audio signal input from the sound source reproducing device to be higher than a gain level of the attenuated noise by a preset level (second gain level) such that the audio signal is output in a state in which it is less affected by noise. When a voice of someone else is detected therearound, the detected voice of someone else may be clearly delivered to the user.

Meanwhile, when the hearing aid function is activated, the control unit 111 may sense there is noise regarding an emergency situation from an audio signal sensed by the microphone 117. In a case in which preset emergency situation noise is included in the detected audio signal, the control unit 111 may output different vibrations or audio signals corresponding to the currently generated emergency situation (for example, an ambulance, a police car, horn, an explosion, and the like) through the earphone so that the user may immediately recognize the occurrence of the emergency situation.

In this manner, in a case in which a current position is outside of the preset vehicle, the control unit 111 may determine a distance to the preset vehicle is within a predetermined distance in a state in which the hearing aid function is activated (S702). That is, when the preset vehicle is not detected according to a detection result from the position sensing unit 113, the control unit 111 may determine that the vehicle is outside of a detection range of the position sensing unit 113. In such a case, the control unit 111 may determine that a current position is outside of the preset vehicle and a distance to the vehicle is outside of a predetermined distance. In such a case, the control unit 111 may attenuate an output and noise by adjusting a gain of an audio signal input from a currently connected sound source reproducing device (S708).

However, when the vehicle is detected according to the sensing result from the position sensing unit 113, the control unit 111 may calculate a distance to the vehicle. On the basis of the calculated distance, the control unit 111 may determine whether the ear set device 100 is positioned within the vehicle, whether the ear set device 100 is positioned outside of the vehicle, or whether the ear set device 100 is positioned within a preset predetermined distance. For example, in a case in which the calculated distance is less than 1 m (for example, a first distance), the control unit 111 may determine that the ear set device 100 is positioned within the vehicle. However, in a case in which the calculated distance is 3 m (for example, a second distance) or less, the control unit 111 may determine that the ear set device is positioned within a predetermined distance. Thus, in a case in which the calculated distance is within the second distance according to the determination result of FIG. 702, the control unit 111 may determine whether the ear set device 100 is currently within the vehicle. In a case in which the calculated distance is less than the first distance, the control unit 111 may determine that the ear set device 100 is within the vehicle. However, when the calculated distance is equal to or greater than the first distance, the control unit 111 may determine that the ear set device 100 is not within the vehicle.

In a case in which the ear set device 100 is not within the vehicle and a distance to the preset vehicle is within a predetermined distance, that is, within a second distance, the control unit 111 may operate in an operation mode for controlling a state of the vehicle according to a user request.

Thus, the control unit 111 may detect whether there is a user request for controlling a state of the vehicle (S704). In some implementations, the user request may be made variously. For example, the user request may be made through a user's voice signal or input of various keys provided in the user input unit 115 of the ear set device 100.

When there is no user request in step S704, the control unit 111 may continue to operate in the earphone operation mode and proceed to step S708 to adjust a gain of an audio signal input from the currently connected sound source reproducing device according to the activated hearing aid function to attenuate an output and noise.

However, in a case in which a user request is detected in step S704, the control unit 111 may be driven in an operation mode (vehicle control mode) for controlling a state of the vehicle (S706). In some implementations, the vehicle control mode may be an operation mode in which a locked state of the vehicle is released or a state of the vehicle is switched to a locked state. The vehicle control mode may be a mode in which various doors of the vehicle, for example, a side door of the driver's seat or the passenger seat, or a sun roof or a trunk of the vehicle are opened and closed according to a user request. Or, the vehicle control mode may be a mode in which the vehicle starts to be driven, that is, the vehicle may be started, according to a user request.

Thus, in a state in which the user wears the earphone 150 and listens to music, the ear set device 100 may access the preset vehicle and release a locked state of the vehicle through a voice command, or the like. When the user, in a state of wearing the earphone 150, gets in the vehicle, the ear set device 100 may activate the hearing aid function corresponding to the interior of the vehicle and collect information related to an operation of the vehicle from various devices provided within the vehicle, and output the collected information through the earphone 150. In such a case, the ear set device 100 may cut off an audio signal transmitted from the sound source reproducing device or limit an output gain of the audio signal transmitted from the sound source reproducing device to a preset level or lower. Thus, in a case in which the user, in a state of listening to music through the earphone 150, gets in the preset vehicle, the control unit 111 may output information related to the vehicle through the earphone 150, instead of music. In some implementations, the user may be the user who has released the locked state of the preset vehicle through the ear set device 100.

This is because, as described above, the control unit 111 of the ear set device 100 may provide vehicle related information according to whether the user requires the vehicle related information. Thus, when the user of the ear set device 100 has been previously registered as a driver of the vehicle or in a case in which the user released a locked state of the vehicle and has driven the vehicle by using the ear set device 100, the ear set device 100 may automatically cut off or limit a sound source currently output through the earphone 150 and cause pieces of information related to the vehicle to be output through the earphone 150.

Meanwhile, the wearing sensing unit 151 provided in the earphone 150 may further include a biometric signal sensor for sensing a biometric signal of the user. In a case in which the user wears the earphone 150, the wearing sensing unit 151 may further sense a biometric signal such as a user's body temperature or a heart rate. Then, the control unit 111 may receive the result of sensing the biometric signal of the user from the earphone 150 and determine a current state of the user.

For example, the control unit 111 may determine whether the user is sleepy on the basis of the result of sensing a pulse rate and/or body temperature. In a case in which it is determined that the user is sleepy, the control unit 111 may perform various functions to allow the user to wake from the sleepiness. For example, the control unit 111 may output an audio signal (for example, white noise or preset sound source data) and/or vibration assisting to prevent sleepiness through the earphone 150. Or, the control unit 111 may drive functions (for example, a function of an air-conditioner or a ventilation function) provided in the vehicle through a vehicle control unit of the vehicle to adjust a ventilation condition or a temperature within the vehicle to allow the user to awake from the sleepiness.

Meanwhile, in the above, the operation of the ear set device 100 has been described with reference to the flowcharts.

Hereinafter, an example in which the ear set device 100, when positioned within a vehicle, provides various types of information related to the vehicle and an example in which the ear set device 100 provides information received from an internal device of the vehicle will be described with reference to the accompanying drawings. Also, an example in which when the ear set device 100 is positioned within a vehicle, the user controls a state of the vehicle using the ear set device 1000 will be described in detail with reference to the accompanying drawings.

Figure 8:
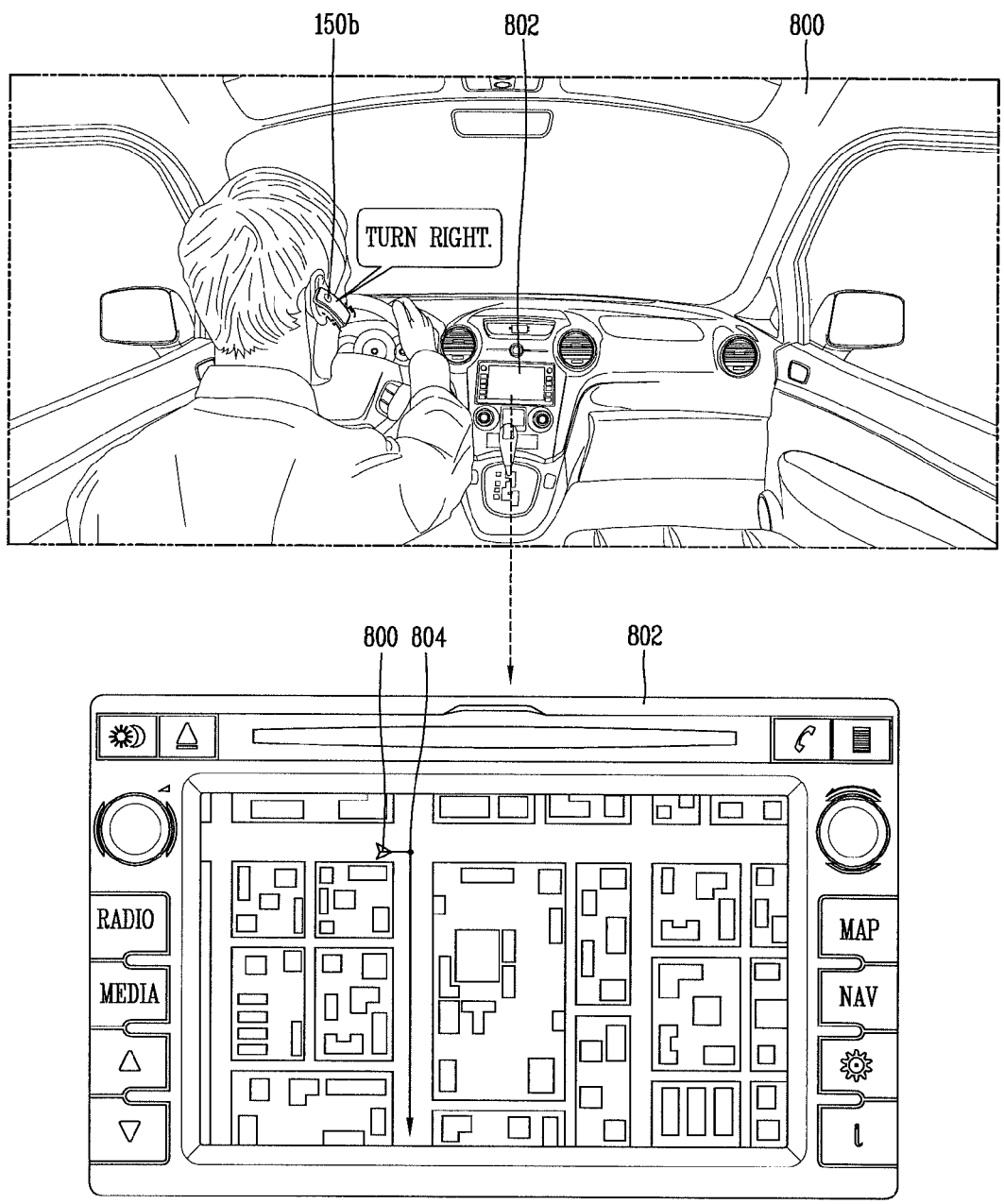
FIG. 8 is a view illustrating an example in which an ear set device outputs information related to an operation of a vehicle through an earphone.

FIG. 8 is a diagram illustrating an example in which an ear set device outputs information related to an operation of a vehicle through an earphone.

As illustrated in the first drawing of FIG. 8, in a case in which the user, who wears the earphone 150, gets in a vehicle, the ear set device 100 may output operation information of the vehicle as vibration and/or a voice signal through the earphone 150. In such a case, when the user wears the earphones 150a and 150b on both ears, respectively, the control unit 111 may cause the operation information of the vehicle to be output only any one of the earphones 150a and 150b according to a driving direction of the vehicle.

That is, for example, as illustrated in the second drawing of FIG. 8, in a case in which the vehicle is currently in a position close to a point in a route at which a driving direction of the vehicle is changed by a distance equal to or greater than a predetermined distance, the control unit 11 may output navigation information indicating a change in the driving direction. In such a case, the navigation information may be output through the earphone 150 in the form of voice information.

Meanwhile, in such a case, the control unit 111 of the ear set device 100 may generate a vibration effect corresponding to the navigation information. For example, in a case in which the user wears earphones 150a and 150b on both ears, the control unit 111 may cause vibration to be output only to a specific earphone corresponding to a changed driving direction according to the navigation information among the earphones 150a and 1500b worn on both ears of the user. Thus, as illustrated in the second drawing of FIG. 8, in a case in which a driving direction of the vehicle is changed to the right at a specific point, that is, at the crossroad, where a driving direction of the vehicle in the route is changed, the control unit 111 may output vibration only to the earphone 150b worn on the right ear among both ears of the user. Also, similarly, only to a specific earphone (for example, the earphone 150b) corresponding to the changed driving direction of the vehicle, the control unit 111 may output information (for example "turn right") regarding the changed driving direction of the vehicle.

Meanwhile, in the first drawing of FIG. 8, it is illustrated that operation information of the vehicle and vibration are generated concurrently, but the voice information and vibration may be output separately. For example, the voice information may be output before the vibration, and the vibration may be output when the vehicle 800 approaches the crossroad 804. For example, when the vehicle 800 arrives at the crossroad 804, the control unit 111 may output vibration, and thus, the user may recognize information regarding the changed driving direction of the vehicle at the point where the driving direction of the vehicle is changed through vibration.

Meanwhile, as mentioned above, when the user wears the earphone 150, the ear set device 100 may allow the user to quickly recognize noise related to an emergency situation in spite of a shielding effect due to the wearing of the earphone 150.

Figure 9:
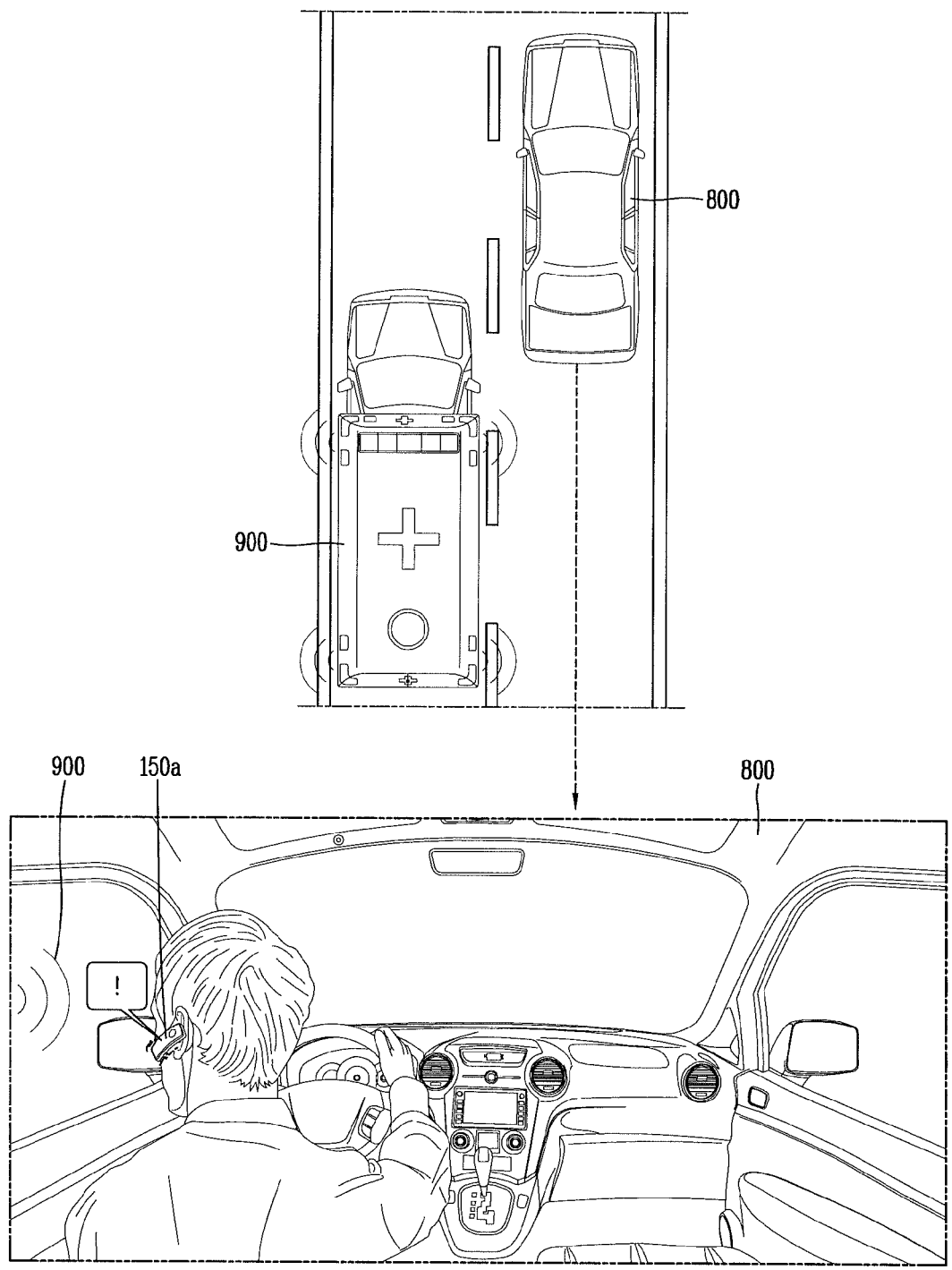
FIG. 9 is a diagram illustrating an example in which when noise corresponding to an emergency situation is sensed from the outside, an ear set device outputs a signal for indicating the sensed noise through an earphone.

FIG. 9 is a diagram illustrating an example in which when noise corresponding to an emergency situation is detected, the ear set device 100 outputs a signal for indicating the detected noise through an earphone.

As described above, the ear set device 100 may detect external noise using the microphone 117 provided in the ear set device 100. When noise corresponding to a preset emergency situation is included in the detected noise, an output gain of a frequency component corresponding to the emergency situation noise may be adjusted to output an audio signal having a magnitude equal to or greater than a preset minimum level or an audio signal having a magnitude equal to or smaller than a preset maximum level.

Thus, as illustrated in the first drawing of FIG. 9, in a case in which an ambulance 900 approaches the vehicle 800 in which the user is present, the microphone 117 may detect a sound of siren that the ambulance goes off, and thus, the control unit 111 may determine that emergency situation noise occurs. In such a case, the control unit 111 may detect a direction in which the emergency situation noise occurs, and output vibration indicating the occurrence of the emergency situation noise to any one earphone corresponding to the detected direction.

That is, as illustrated in the first drawing of FIG. 9, in a case in which the ambulance 900 approaches the left side of the vehicle 800 in which the user is present, the control unit 111 may output vibration to only one earphone 150a worn on the left ear, among the earphones 150a and 150b worn on both ears of the user. The second drawing of FIG. 9 illustrates a corresponding example.

Together with vibration, the control unit 111 may output a sound of siren with an output gain adjusted to be equal to or higher than the preset minimum level or equal to or lower than the preset maximum level through at least one of the earphones 150a and 150b. In such a case, the control unit 111 may cause the sound of siren to be output only to the earphone corresponding to the direction in which the emergency situation noise occurs, that is, only to the earphone 150a worn on the left ear of the user.

Meanwhile, as mentioned above, when the user, in a state of wearing the earphone 150, gets in the vehicle, the control unit 111 of the ear set device 100 may provide information related to various events generated in various devices within the vehicle to the user.

Figure 10:
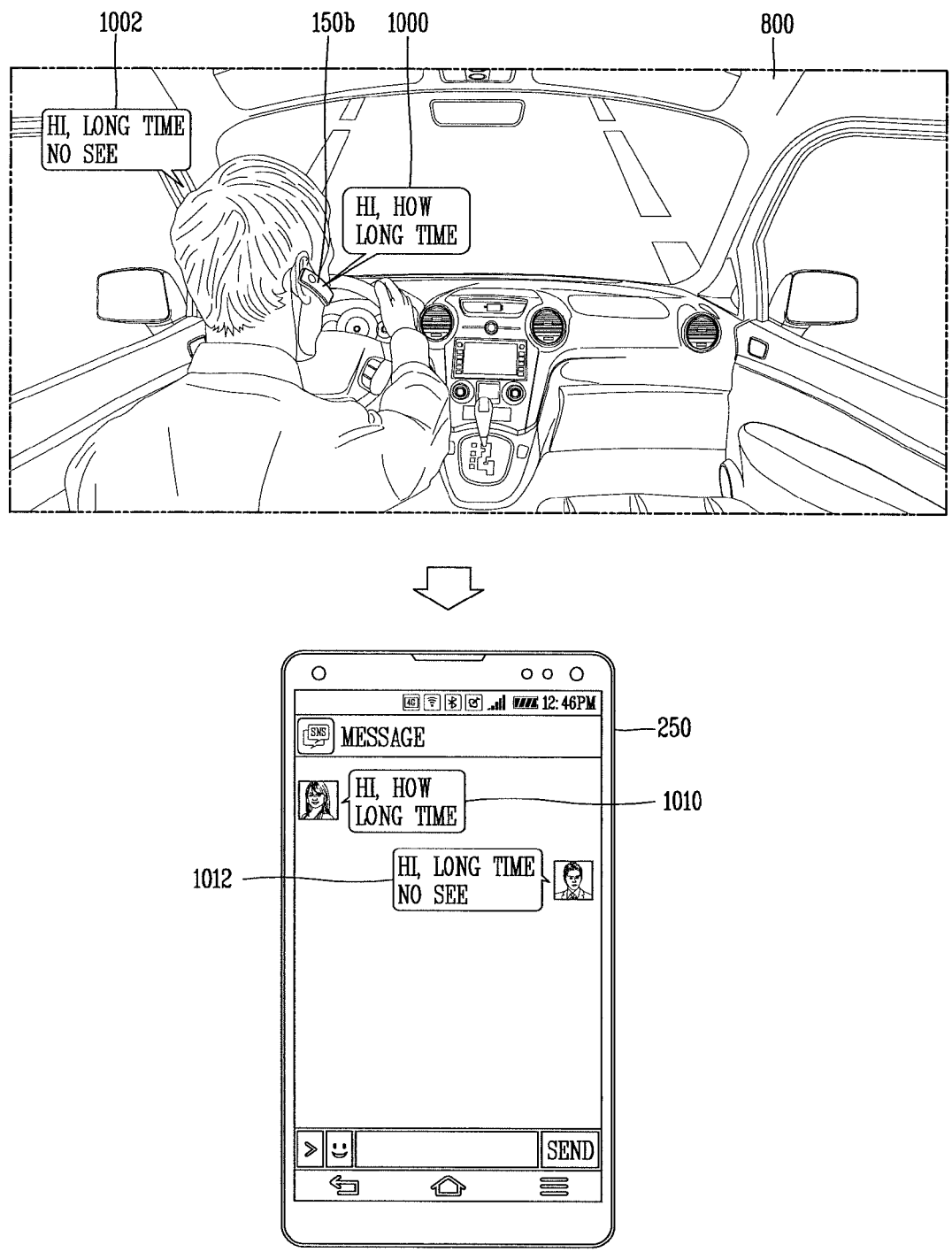
FIG. 10 is a diagram illustrating an example in which an ear set device is connected to a smartphone.

FIG. 10 is a diagram illustrating an example in which the ear set device 100 is connected to a smartphone of the user.

For example, when the user wears the earphone 150 within a vehicle 800, the control unit 111 may be connected to various devices within the vehicle. In some implementations, the devices within the vehicle 800 may refer to a control unit of the vehicle 800, a navigation device separately provided within the vehicle 800, or devices such as a smartphone, a table PC, or a notebook computer of the user.

When a specific is connected, the control unit 111 may detect whether a specific event occurs in the connected device. In some implementations, the event may include a case in which a specific function is executed in the device as the user operates the device. Thus, in a case in which the user executes a call function for originating a call or a message function for sending a message in the smartphone, the control unit 111 may determine that an event occurs in the smartphone. Thus, in a case in which a specific function is executed by the user, as well as in a case in which a specific function is executed in the currently connected device by an external influence (for example, a call function or a message function is performed in the smartphone according to a terminated call or a received message), the control unit 111 may detect the executed specific function as an event generated in the connected device.

When the event is detected, the control unit 111 may output information related to the generated event to the user through the earphone 150. For example, in a case in which the event is a call function based on a call terminated to the smartphone or an originated call, the control unit 111 may connect a call according to the call function, receive a voice signal of a counterpart of the call from the smartphone, outputs the received voice signal to the earphone, and transmits a user's voice signal to the smartphone.

Meanwhile, when the event is a received message, the control unit 111 may convert contents of the received message into a voice signal (TTS function) and output the voice signal through the earphone 150. Or, conversely, in a case in which the event is origination of a message, the control unit 111 may convert a voice signal of the user sensed through the microphone 117 into text (STT function), and transmit the text as contents of a message to be created to the smartphone. In such a case, the smartphone may originate a message including the text converted from the user's voice signal under the control of the control unit 111.

Meanwhile, the ear set device 100 may exchange an SNS message using these functions. That is, as illustrated in FIG. 10, the control unit 111 may convert a received SNS message 1010 into voice information 10000 and output the converted voice information 1000 to the earphone 150. In a case in which a voice signal 1002 s input from the user, the control unit 111 may convert the voice signal 1002 into text and transmit the converted text as a message 1012.

Figure 11:
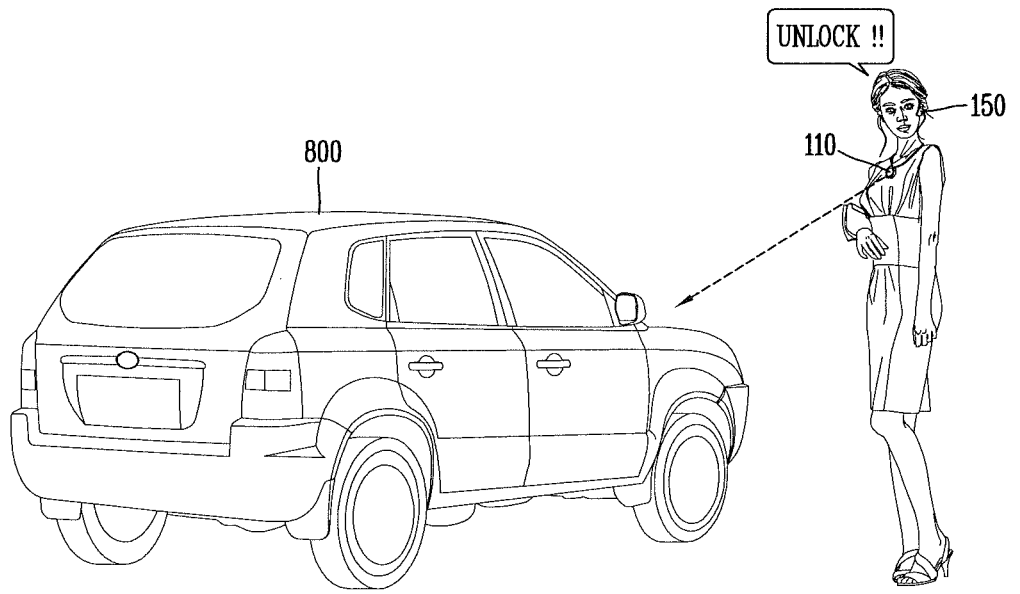
FIG. 11 is a diagram illustrating an example in which a locked state of a vehicle is released through an ear set device.
Figure 11:
Figure 11:
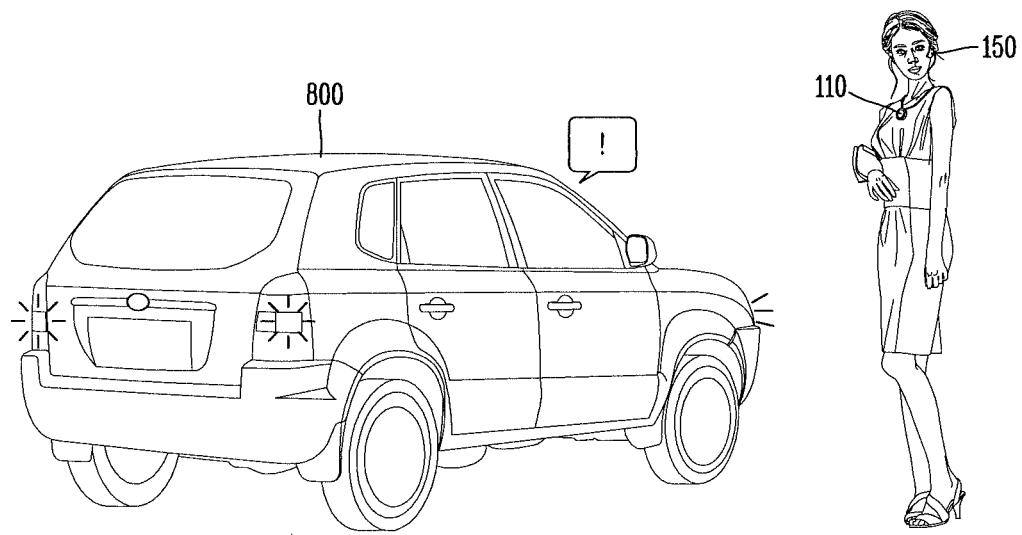

Meanwhile, as mentioned above, the ear set device 100 may provide a function of controlling a state of the vehicle 800 according to a distance to the preset vehicle 800. FIG. 11 illustrates an example in which the ear set device 100 controls a state of a vehicle.

For example, as illustrate din the first drawing of FIG. 11, in a case in which a distance between the ear set device 100 and the preset vehicle 800 is equal to or smaller than a predetermined value, the control unit 111 may operate in an operation mode for controlling a state of the vehicle 800 according to whether there is a user request. In such a case, when there is no user request for controlling a state of the vehicle 800, the ear set device 100 may be continuously driven in the earphone operation mode.

However, as illustrated in the first drawing of FIG. 11, in a case in which a voice signal (for example "unlock") for releasing a state of the vehicle 800 is received from the user, the control unit 111 may transmit information previously stored in the memory 1114 to the vehicle 800. In some implementations, the information previously stored I n the memory 114 may be key information for releasing a locked state of the vehicle 800, that is, information corresponding "smart key" of the vehicle 800. In such a case, as illustrated in the second drawing of FIG. 11, a locked state of the vehicle 800 may be released according to the transmission of the key information.

Meanwhile, the ear set device 100 may be used to change a state of the vehicle into a locked state according to a user request. That is, in a state in which the user is away from the vehicle 800 by a predetermined distance or longer, when a voice signal (for example, "Lock") for changing the vehicle 800 into a locked state is received, the control unit 111 may transmit key information for changing the vehicle 800 to the locked state to the vehicle 800. According to the key transmission, the state of the vehicle 800 may be changed to the locked state.

Meanwhile, in the above, the example in which the user releases a locked state of the vehicle 800 or changes the vehicle 800 into a locked state by voice has been described with reference to FIG. 11, but the user request may be made in various manners. For example, the control unit 111 may release a locked state of the vehicle 800 or change a state of the vehicle 800 into a locked state on the basis of a key input applied to the user input unit 115. Various user requests for to controlling a state of the vehicle 800 may be arbitrarily determined by the use. That is, the user may create and user other commands than "Unlock" or "Lock" in order to release a locked state of the vehicle 800 or change a state of the vehicle into a locked state.

Also, in changing a state of the vehicle 800 into a locked state, even though the user does not request locking of the vehicle 800, when it is determined the ear set device 100 is away from the vehicle 800 by a predetermined distance or longer, the control unit 111 of the vehicle 800 may automatically change a state of the vehicle to a locked state.

Meanwhile, in case of including key information of the vehicle, the ear set device 100, when lost, may prevent key information from being used without authorization through various security procedures. For example, the control unit 111 may analyze a voice feature of the user from a voice command of the user for controlling a state of the vehicle 800, and recognize the user using the analyzed voice feature of the user. That is in a case in which a voice command for controlling a state of the vehicle 800 is input from the user, the control unit 111 may analyze a voice feature thereof and determine whether the voice is a previously stored voice of the user. Only when the voice command is input from the recognized user, the control unit 111 may cause a state of the vehicle 800 to be controlled.

Thus, in the ear set device 100 , first, in order to cause an input voice command to control a state of the vehicle 800, the voice command should be match a preset voice command, and second, only when a voice feature of the voice command matches a previously stored voice feature of the user, the state of the vehicle 800 is controlled, whereby when the ear set device 100 is lost, a third party who obtains the ear set device is prevented from controlling a state of the vehicle 800 without authorization.

Meanwhile, in the above, the case in which a call function of a message transmission/reception function is performed using a smartphone of the user has been described as an example, but the ear set device 100 is not limited thereto. That is, as described above, when a specific function is executed in a connected device, the ear set device 100 may detect the execution of the specific function in the connected device as occurrence of an event, and in some implementations, the specific function may be diverse. That is, the specific function may include various functions of the smartphone, for example, schedule management or notification function, a function of recording a memo, a function of providing weather information or providing information such as a breaking new, or the like. Thus, the user may be provided with information related to the functions executed through the smartphone, as an audio signal output from the earphone 150 through the ear set device 100.

Meanwhile, in the above, the case in which when the user, in a state of wearing the earphone, gets in a vehicle, the ear set device 100 automatically outputs information related to the vehicle, as an audio signal or vibration through the earphone 150 has been described as an example, but the function of the earphone 150 may be determined as to whether it is to be driven according to a user selection. That is, for example, when the user gets in the vehicle and requests deactivation of the earphone 150, the control unit 111 may deactivate the earphone 150 in response to the user request. For example, such a deactivation request may be made through a preset key input or input of a voice signal of the user. In a case in which the earphone 150 is deactivated, the control unit 111 may not output the information related to the vehicle, as well as the audio signal output from a currently connected sound source reproducing device, through the earphone 150.

Meanwhile, in a case in which the earphone 150 is deactivated, the control unit 111 may detect whether the user wears the earphone 150 through the wearing sensing unit 151 of the earphone 151. In a case in which the user continues to wear the earphone 150 in a deactivated state, the control unit 111 may output a warning inducing the user to put off the earphone 150, to the user. This is because, if the user continues to wear the earphone 150 in the deactivated state, the user may not be able to recognize an external audio signal (for example, navigation information output from an audio output device of the vehicle or a voice of other passenger) due to a shielding effect of the earphone 150.

In some implementations, the "warning" may be an audio signal or vibration previously set for inducing the user to put off the earphone 150, and may be output through the earphone 150 that the user wears currently. Or, the "warning" may also be output through an image information display device or an audio output device provided within the vehicle.

Meanwhile, even in a case in which the earphone 150 is in a deactivated state, the control unit 111 may detect an event that occurs in other connected device. In such a case, even though the earphone 150 is in the deactivated state, the control unit 111 may output information related to the event that occurs in the different device. In some implementations, in a case in which the earphone 150 is in the deactivated state, when an event occurs in a specific device previously set by the user and/or when a specific event occurs, the control unit 111 may cause information related to the event be output to the earphone 150.

For example, such a specific device may be the smartphone of the user. In such a case, even though the earphone 150 is in the deactivated state, when an event such as call termination or a message reception occurs in the smartphone of the user, the control unit 111 may temporarily activate the earphone 150 and output information related to the terminated call or the received message (for example, information regarding a caller of the terminated call or a sender of the message) through the earphone 150.

Meanwhile, in a case in which the earphone 150 is in the deactivated state, a function related to call termination or message reception (for example, a function of connecting a terminated call or converting a received message into a voice signal and outputting the converted voice signal, and the like) may not be performed. In such a case, in order to perform the function related to the terminated call or the received message, the user may switch the earphone 150 to an activated state. In some implementations, a request for switching the earphone 150 to the activated state may be made through a preset key input or an input of a voice signal of the user.

Meanwhile, in the above, the case in which two earphones 150a and 150b are inserted into and connected to the ear set device 100 has been described as an example, but the number of the earphones may be fewer or greater. That is, for example, in a case in which one earphone is provided, the control unit 111 may provide information regarding a direction in which noise corresponding to an emergency situation occurs or a driving direction of a vehicle to be changed to the user, by differentiating a period, strength, or a form of vibration output to the single earphone.

Meanwhile, as described above, when the ear set device 100 is detected to be within the vehicle according to a result of position detection, the control unit 111 of the ear set device 100 may activate a preset hearing aid function (steps S300 and S302 of FIG. 3). Accordingly, in a case in which the vehicle in which the ear set device 100 is currently positioned is set as a default to output an audio signal through a preset audio output device (for example, a Bluetooth speaker), an audio signal output from the audio output device may be output to the user through the hearing aid function.

Hereinafter, a case in which the user wears the ear set device 100 and gets in the vehicle in which an audio signal related to various events that occur in the vehicle is set to be output through an audio output device provided in the vehicle will be assumed and described.

Figure 12:
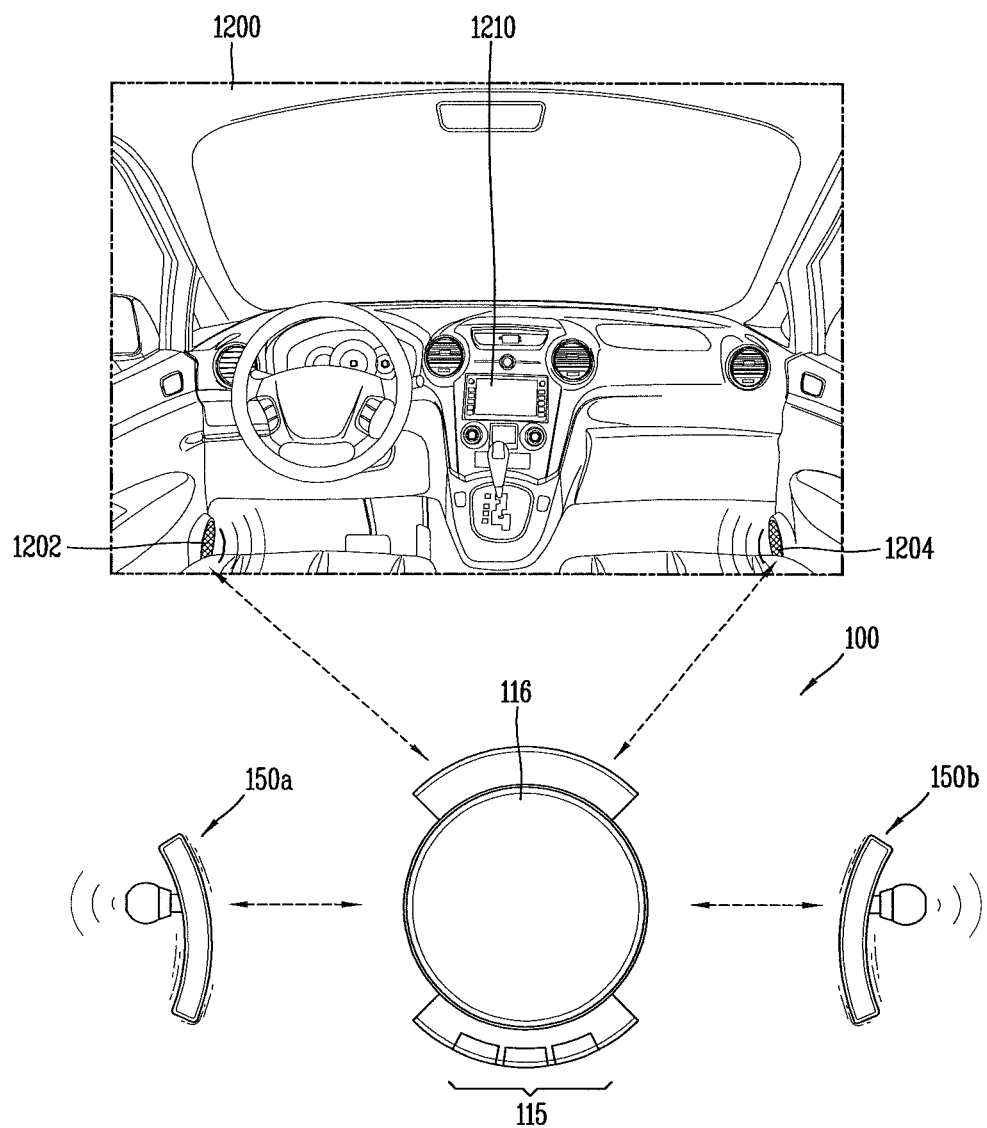
FIG. 12 is a diagram illustrating an example in which an ear set device is connected to a sound output device provided within a vehicle.

FIG. 12 is a diagram illustrating an example in which an ear set device is connected to a sound output device provided within a vehicle.

Referring to FIG. 12, an example in which the main body 110 of the ear set device 100 is wirelessly connected to audio output devices (for example, Bluetooth speakers 1202 and 1204) and earphones 150a and 150b provided within a vehicle 1200. In some implementations, the audio output devices 1202 and 1204 may be provided in the vehicle 1200 such that they output an audio signal related to various events that occur in the vehicle 1200. In such a case, a control unit of the vehicle 1200 may output an audio signal related to various events that occur in the vehicle 1200 through the audio output devices 1202 and 1204 such that all passengers within the vehicle may be able to listen to the audio signal related to various events that occur in the vehicle 1200.

In some implementations, the event that occurs in the vehicle 1200 may be diverse. For example, when a preset mobile device is connected, the control unit of the vehicle 1200 may detect an event detected in the mobile device, as an event detected in the vehicle 1200. Thus, in a case in which a message is received by a mobile device of the user (for example, a smartphone 250 of the user) or in a case in which a call is received, it may detect that an event has occurred in the vehicle 1200.

Meanwhile, the event that occurs in the vehicle 1200 is not limited to the event that occurs in the preset mobile device. For example, the event may include various events related to an operation of the vehicle. That is, in a case in which navigation information is generated by a navigation device 1210 provided in the vehicle 1200 while the user is driving the vehicle 1200, it may be detected that an event has occurred. Or, in a case in which various types of information generated in an operation route of the vehicle 1200, for example, disaster information or information regarding a specific traffic condition is received during operation of the vehicle 1200, these may be events that occur in the vehicle 1200.

Meanwhile, in a case in which such an event occurs in the vehicle 1200, an audio signal regarding the generated event may be output through the earphones 150a and 150b connected to the main body 110 or through the audio output devices 1202 and 1204. In some implementations, the audio signal related to the generated event may be output through any one of the earphones 150a and 150b or the audio output devices 1202 and 1204 according to whether there is a passenger together with the user currently in the vehicle 1200, according to whether the generated event is a preset event, or according to a type of the generated event.

For example, in a case in which the generated event is not a preset event, the audio signal related to the event may be output through the audio output devices 1202 and 1204 along a currently set audio signal output path. In such a case, the control unit 111 of the ear set device 100 may cancel noise using the aforementioned hearing aid function and output the noise-canceled audio signal (the audio signal related to the currently generated event) through the earphones 150a and 150b.

Meanwhile, when the currently generated event is a preset event, the control unit 111 of the ear set device 100 may cause audio information regarding the event generated in the vehicle 1200 to be output through the earphones 150a and 150b. To this end, the control unit 111 of the ear set device 100 may directly control the connected audio output devices 1202 and 1204 not to output the audio signal related to the event or may control a control unit of the vehicle 1200 not to output the audio signal related to the event from the audio output devices 1202 and 1204.

Also, even though the generated event is a preset event, the control unit 111 may cause the audio information regarding the event to be output through the earphones 150a and 150b or through the audio output devices 1202 and 1204 according to whether there is passenger together with the user currently within the vehicle 1200. For example, in a case in which there is a passenger, the control unit 111 may cause audio information related to the event to be output through the earphones 150a and 150b, and in a case in which there is no passenger, the control unit 111 may cause the audio information to be output through the basic output setting, that is, through the audio output devices 1202 and 1204 provided within the vehicle 1200.

This is because, if only the user is present in the vehicle 1200, there is no need to limit the output of the audio signal related to the event such that the user may listen to it. Thus, in a case in which even one passenger is not riding together with the user in the vehicle, the audio signal may be output through the audio output devices 1202 and 1204. The audio information output through the audio output devices 1202 and 1204 may be output to the user in a state in which noise thereof has been removed through the hearing aid function of the ear set device 100.

Figure 13:
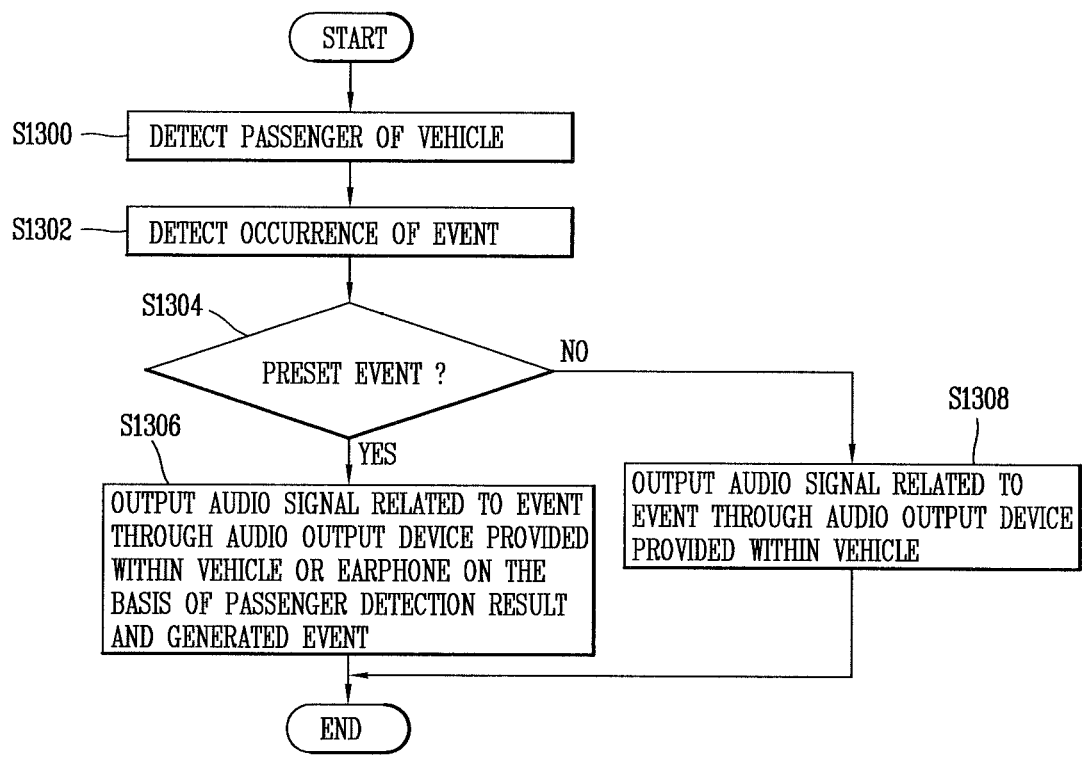
FIG. 13 is a flowchart illustrating an operational process in which an ear set device determines an output path of an audio signal related to an event that occurs in a vehicle.

FIG. 13 is a flowchart illustrating an operational process in which an ear set device determines an output path of an audio signal related to an event that occurs in the vehicle 1200. In the following descriptions, it is assume that the user who wears the ear set device 100 is present in the vehicle including the preset audio output devices 1202 and 1204 to output audio information related to a generated event as described above with reference to FIG. 12. Also, for the purposes of description, it is assumed that the user who wears the ear set 100 is a driver driving the vehicle 1200.

Referring to FIG. 13, the control unit 111 of the ear set device 100 may detect a passenger who is currently riding in the vehicle (S1300).

Step S1300 may include a process of receiving information regarding a result of detecting the passenger currently riding in the vehicle from the vehicle control unit of the vehicle 1200 in which the user is currently present. The passenger detection information received from the vehicle control unit may include the number of passengers currently riding in the vehicle 1200 and a result of identifying the passengers.

For example, the vehicle control unit of the vehicle 1200 may detect the number of passengers currently riding in the vehicle 1200 from an image currently received through a camera provided in the vehicle 1200. Alternatively, the vehicle control unit may sense a mass sensed in each seat provided in the vehicle 1200 and detect whether there is a seat on which a person is seated among seats of the vehicle 1200. In such a case, when a mass sensed in a specific seat has a level equal to or greater than a preset level, the vehicle control unit may determine that a person is seated on the corresponding seat.

Alternatively, the vehicle control unit of the vehicle 1200 may detect the number of passengers currently riding in the vehicle 1200 and recognize the passengers according to the result of detecting mobile devices currently positioned within the vehicle 1200. In such a case, the vehicle control unit may receive identification information (for example, a phone number, of the like) from the detected mobile devices within the vehicle 1200, and identify passengers on the basis of the received identification information. That is, in a case in which identification information which is the same as identification information included in a previously stored list of passengers is received from a mobile device positioned within the vehicle 1200, the vehicle control unit may determine that a person corresponding to the mobile device is currently within the vehicle 1200.

Alternatively, in order to identify the passengers, the vehicle control unit may use an image received from a camera provided within the vehicle. In such a case, the vehicle control unit may identify passengers currently riding in the vehicle 1200 through facial images of the passengers received from the camera. Meanwhile, the vehicle control unit may identify the passengers currently riding in the vehicle 1200 simultaneously using at least two of the methods described above.

Thus, the vehicle control unit may recognize and identify the passengers currently riding in the vehicle 1200. In a case in which a preset passenger (that is, the user who wears the ear set device 100) as a driver of the vehicle 1200 is included in the identified passengers, the vehicle control unit may determine that the user drives the vehicle 1200.

In step S1300, the control unit 111 of the ear set device 100 may receive the result of recognizing and identifying the detected passengers from the vehicle control unit. Thus, in step S1300, in a case in which the number of passengers currently riding in the vehicle 1200 and the passengers are identifiable, the control unit 111 of the ear set device 100 may detect that the user who wears the ear set device 100 is currently driving the vehicle.

Alternatively, the vehicle control unit may transmit the information detected from the passengers currently riding in the vehicle 1200, such as an image received from the camera provided within the vehicle, the result of detecting the mobile devices currently positioned within the vehicle 1200, the mass sensed in a specific seat, and the like, to the ear set device 100. In such a case, the control unit 111 of the ear set device 100 may recognize the number of the passengers currently riding in the vehicle 1200 and identify the passengers on the basis of the information received from the vehicle control unit by using a preset image recognition algorithm, previously stored passenger information, a preset mass reference, and the like.

The control unit 111 of the ear set device 100 may detect an event that occurs in the vehicle 1200 (S1302). For example, in step S1302, as described above, the event may be an event that occurs in mobile device connected to the vehicle 1200. In some implementations, the mobile device connected to the vehicle 1200 may be a mobile device (for example, a smartphone 250 of the user) of the user currently as a driver of the vehicle 1200. Alternatively, step S1302 may be a step of detecting occurrence of various events related to an operation of the vehicle.

Meanwhile, when occurrence of an event is detected in step S1302, the control unit 111 may determine whether the generated event is a preset event (S1304). In some implementations, the preset event may be determined according to preset information by the user. That is, in a case in which the user sets specific caller information (for example, a phone number) in advance, the event generated in relation to the specific caller information may be a preset event. That is, when a message is received or a call is terminated from a caller corresponding to the specific caller information, the control unit 111 may determine that the preset event occurs in step S1304.

Alternatively, the preset event may be generation of preset specific information by the user. For example, navigation information, a current position of the vehicle, or information indicating an accident or disaster that occurs in an operation route of the vehicle (hereinafter, referred to as "disaster information") may be the specific information. In some implementations, in a case in which the navigation information is generated in the vehicle 1200 or the disaster information is received, the control unit 111 of the ear set device 100 may determine that the preset event has occurred.

Meanwhile, when it is determined that the preset event has occurred according to the determination result in step S1304, the control unit 111 may output an audio signal regarding the generated event through the audio output devices 1202 and 1204 or the earphones 150a and 150b provided within the vehicle 1200 on the basis of the result of detecting the passengers in step S1300 and the generated event (S1306).

For example, in a case in which the currently generated event is a message sent from a preset specific sender or a call received from the specific caller (or sender), the control unit 111 may output alarm (for example, a bell sound) indicating the received message or the received call through the audio output devices 1202 and 1204 or the earphones 150a and 150b on the basis of the currently detected passengers in step S1306.

For example, in step S1306, in a case in which a passenger other than the user is currently riding in the vehicle 1200, the control unit 111 may output the alarm through the earphones 150a and 150b worn on the user. In such a case, the alarm may not be output through the audio output devices 1202 and 1204. Meanwhile, in a case in which only the user is present within the vehicle alone, the control unit 111 may output the alarm through the audio output devices 1202 and 1204. Hereinafter, an operational process of determining an output path of an audio signal related to a generated event in the ear set device 100 in a case in which the currently generated preset event is a call a message received from a specific caller or sender will be described in detail with reference to FIG. 13.

Meanwhile, as described above, the preset event may include generation of disaster information indicating an accident or disaster that occurs in the current location of the vehicle or in an operation route of the vehicle. Also, when emergency situation noise described above with reference to FIG. 5 is detected, the control unit 111 of the ear set device 100 may determine that the disaster information is received. Also, the control unit 111 may determine that the preset event has occurred.

In such a case, in step S1306, the control unit 111 may determine a type of the currently generated disaster information, and output an audio signal related to the disaster information through the audio output devices 1202 and 1204 or the earphones 150*a* and 150*b* according to the determined type of the disaster information.

For example, in case in which the currently received disaster information is information related to only an operation of the vehicle 1200, like information indicating an accident that occurs in an operational route of the vehicle, the control unit 111 may determine that the disaster information is not required for the passenger who does not drive the vehicle 1200. The control unit 111 may output the audio signal related to the disaster information through the earphones 150*a* and 150*b* worn on the user. In such a case, the alarm may not be output through the audio output devices 1202 and 1204, and thus, the audio information may be output only to the user as a driver of the vehicle 1200.

Meanwhile, the control unit 111 may output disaster information that a passenger needs to listen to, like natural disaster having a level equal to or higher than a predetermined level, through the audio output devices 1202 and 1204, so that the passenger, as well as the user who currently drives the vehicle, may listen to the disaster information. Also, in a case in which the emergency situation noise is detected, the control unit 111 may output an audio signal corresponding to the is detected emergency situation noise through the audio output devices 1202 and 1204 such that the passenger may also listen to it. This is because, in the case of the detected emergency situation noise, which is currently generated in the vicinity of the vehicle 1200, the passenger needs to recognize that the emergency situation has occurred currently.

Meanwhile, as described above, in a case in which the audio signal corresponding to the emergency situation noise is output through the audio output devices 1202 and 1204, as described above with reference to FIG. 5, the audio signal corresponding to the emergency situation noise may be output through any one audio output device 1202 or1204 provided in a position corresponding to a direction in which the emergency situation noise has been detected, among the audio output devices 1202 and 1204.

Also, in a case in which generation of navigation information is included as the preset event, in step S1306, the control unit 111 may determine a type of the currently generated navigation information and output the generated navigation information through the audio output devices 1202 and 1204 or through the earphones 150*a* and 150*b* according to the determined type of the navigation information. Thus, the information not required for the passenger, that is, the navigation information including information indicating an operation route of the vehicle required for the driver who drives the vehicle 1200, may be output through the earphones 150*a* and 150*b* worn on the user. Meanwhile, navigation information useful for the passenger as well as for the driver, such as a time required to reach a destination or a distance to the destination, may be output through the audio output devices 1202 and 1204, such that the passenger, as well as the driver who currently drives the vehicle, may listen to the corresponding navigation information.

Hereinafter, an operational process of determining an output path of an audio signal related to a generated event in the ear set device 100 in a case in which the currently generated preset event is occurrence of disaster information or generation of navigation information will be described in detail with reference to FIGS. 15 and 16.

Meanwhile, in a case in which the currently generated event is not a preset event according to the determination result in step S1304, the control unit 111 may output an audio signal regarding the currently generated event according to the preset audio signal output path. In some implementations, as described above, in a case in which the audio output devices 1202 and 1204 are provided within the vehicle 1200 and connected such that various audio signals may be output through the audio output devices 1202 and 1204, an audio signal related to the event may be output through the audio output devices 1202 and 1204 (S1308). Thus, even through there is a passenger and a call is terminated to the user who drives the vehicle 1200, if a caller of the call is not a preset caller, an alarm indicating the terminated call (or an incoming call) may be output through the audio output devices 1202 and 1204.

Meanwhile, when a call is terminated from a preset specific caller or when a message originated from the specific caller (or sender) is received by the mobile device connected to the vehicle 1200, the control unit 111 of the ear set device 100 may determine that a preset event occurs in step S1304 of FIG. 13. Also, as described above, an alarm (for example, a bell sound) indicating the received message or the terminated call may be output through the audio output devices 1202 and 1204 or the earphones 150*a* and 150*b* on the basis of whether there is a passenger.

That is, in step S1306 of FIG. 1, in a case in which a passenger is currently riding in the vehicle 1200 in addition to the user, the control unit 111 may output an audio signal related to the received message or the terminated call through the earphones 150*a* and 150*b* worn on the user. In such a case, the alarm may not be output through the audio output devices 1202 and 1204. Meanwhile, in a case in which only the user is currently present alone in the vehicle 1200, the control unit 111 may output the alarm through the audio output devices 1202 and 1204.

Meanwhile, the control unit 111 of the ear set device 100 may determine a path in which the audio signal related to the received message or the terminated call is output according to whether the passenger currently riding in the vehicle 1200 together with the user is a preset passenger according to a result of identifying the passenger, as well as whether there is a passenger.

Figure 14:
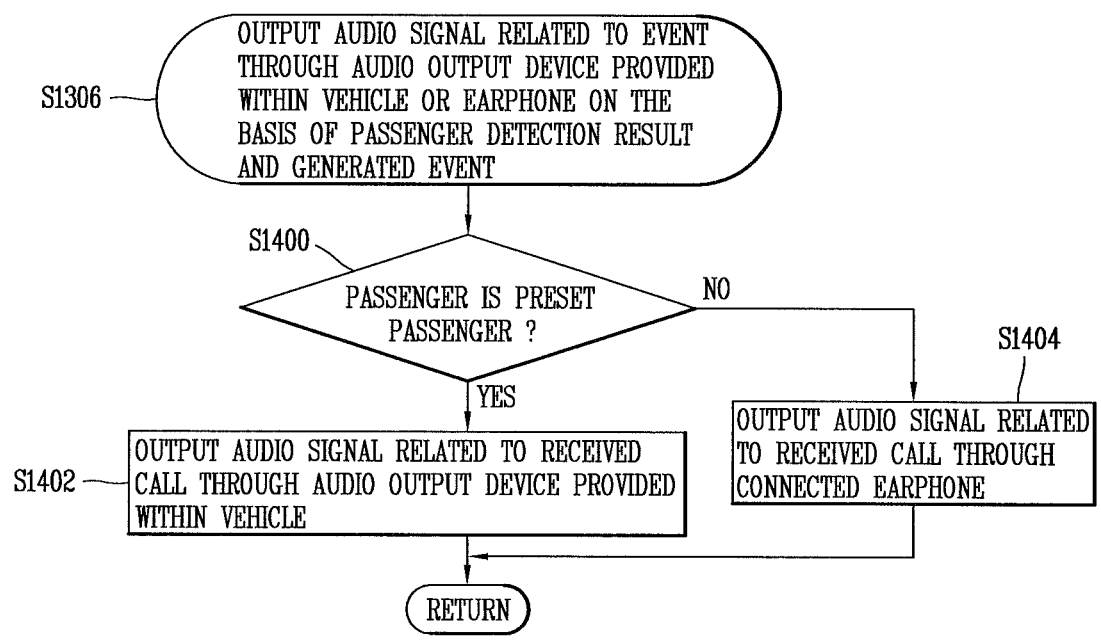
FIG. 14 is a flowchart illustrating an operational process in which an ear set device determines an output path of an audio signal related to an event which occurs in a vehicle when the event is a call or a message received from a preset caller.

FIG. 14 is a flowchart illustrating an operational process in which an ear set device determines an output path of an audio signal related to an event which occurs in the vehicle 1200 when the event is a call or a message received from a preset caller.

Referring to FIG. 14, the control unit 111 may determine whether there is a passenger currently riding in the vehicle 1200 together with the user on the basis of passenger detection information (step S1300 of FIG. 13) received from the vehicle control unit of the vehicle 1200, and when there is a passenger, the control unit 111 may identify whether the passenger is a preset passenger (S1400).

In some implementations, the preset passenger may be a person previously set to share information related to a message that the user receives from the specific sender or a call terminated from the specific caller with the user. For example, in a case in which the passenger is in a family relationship with the user, the other family members of the passenger and the user may be the specific caller (or sender).

In a case in which the currently detected passenger is a preset passenger, the control unit 111 may output an audio signal related to the message received from the specific caller or the call terminated from the specific caller through the audio output devices 1202 and 1204 provided within the vehicle 1200. Thus, an alarm (for example, a phone number) indicating the message received from the specific sender or the call terminated from the specific caller and/or contents of the message or contents according to the call may be output through the audio output devices 1202 and 1204, and thus, both the user and the passenger may listen to the alarm and/or the contents of the message or the call. That is, in a case in which the passenger is a preset passenger, the control unit 111 of the ear set device 100 may provide a function corresponding to a speaker phone using the audio output devices 1202 and 1204 provided within the vehicle 1200.

Meanwhile, in a case in which the passenger is not a preset passenger according to the identification result in step S1400, the control unit 111 may output the message received from the specific sender or the call terminated from the specific caller, or an audio signal (a bell sound and/or call contents, or the like) related to the received message through the earphones 150*a* and 150*b* (S1404). Thus, in a case in which the passenger is a third party not registered by the user in advance, the passenger may be prevented from obtaining information related to the specific sender or caller. In such a case, the control unit 111 may output even an alarm indicating the terminated call or the received message through the earphones 150*a* and 150*b*, so that the passenger may not recognize that the call is terminated from the specific caller or the message is received from the specific sender.

Meanwhile, in the above, the case in which, when the passenger is a preset passenger according to the identification result in step S1400, audio information related to the call or message received from the specific caller or sender is output in such a manner both the passenger and the user may listen to it (output through the audio output devices 1202 and 1204) has been described as an example, but conversely, in a case in which the passenger is a preset passenger, audio information related to the call or message received from the specific caller or sender may be output in such a manner that only the user may listen to it (output through the earphones 150*a* and 150*b*).

For example, as described above with reference to FIG. 12, the vehicle 1200 maybe in a state previously set such that an audio signal related to various events that occur in the vehicle 1200 is output through the audio output devices 1202 and 1204 provided within the vehicle 1200. When a call terminated from the preset specific caller or a message originated by the specific sender is received by the mobile device connected to the vehicle 1200, the control unit 111 may determine that a preset event occurs in step S1304 of FIG. 13.

The control unit 111 may identify whether the passenger currently riding in the vehicle is a preset passenger. In a case in which the passenger is not a preset passenger according to the identification result in step S1400, the control unit 111 may output audio information related to the call or message received from the specific caller or sender through the audio output devices 1202 and 1204 according to a current basic setting (default) of the vehicle 1200. Thus, in a case in which the passenger is not a preset passenger, an alarm, or the like, indicating the call or the message received from the specific caller or sender may be output such that both the passenger and the user may listen to it.

Meanwhile, in a case in which the passenger is a preset passenger according to the identification result in step S1400, the control unit may output an audio signal (a bell sound, or the like) related to the call or the message received from the specific caller or sender, through the earphones 150*a* and 150*b*. Thus, in a case in which the passenger is a preset passenger, the audio signal related to the call or the messages received from the specific caller or sender may be output such that only the user may listen to it.

Meanwhile, in the above description with reference to FIG. 14, it is disclosed that the audio signal (bell sound, or the like) is output through the earphones 150*a* and 150*b* or output through the audio output devices 1202 and 1204 according to whether the passenger is an identified passenger, but the present disclosure may also be applied even to a case in which the passenger is in plurality. For example, in a case in which the passenger is in plurality, in a case in which all of the plurality of passengers are preset passengers according to a user selection, the control unit 111 may determine that the passenger is a preset passenger in step S1400. Alternatively, in a case in which at least one of the plurality of passengers is a preset passenger, the control unit 111 may determine that the passenger is a preset passenger in step S1400. An audio signal (bell sound, or the like) related to the call or the message received from the specific caller or sender may be output through the audio output devices 1202 and 1204 or the earphones 150*a* and 150*b* according to the determination result in step S1400.

Meanwhile, as described above, in a case in which navigation information for guiding an operation route of the vehicle is generated or in a case in which information indicating an accident or disaster situation that occurs in a current location of the vehicle or in an operation route of the vehicle is received, the control unit 111 of the ear set device 100 may detect that a preset event has occurred.

Figure 15:
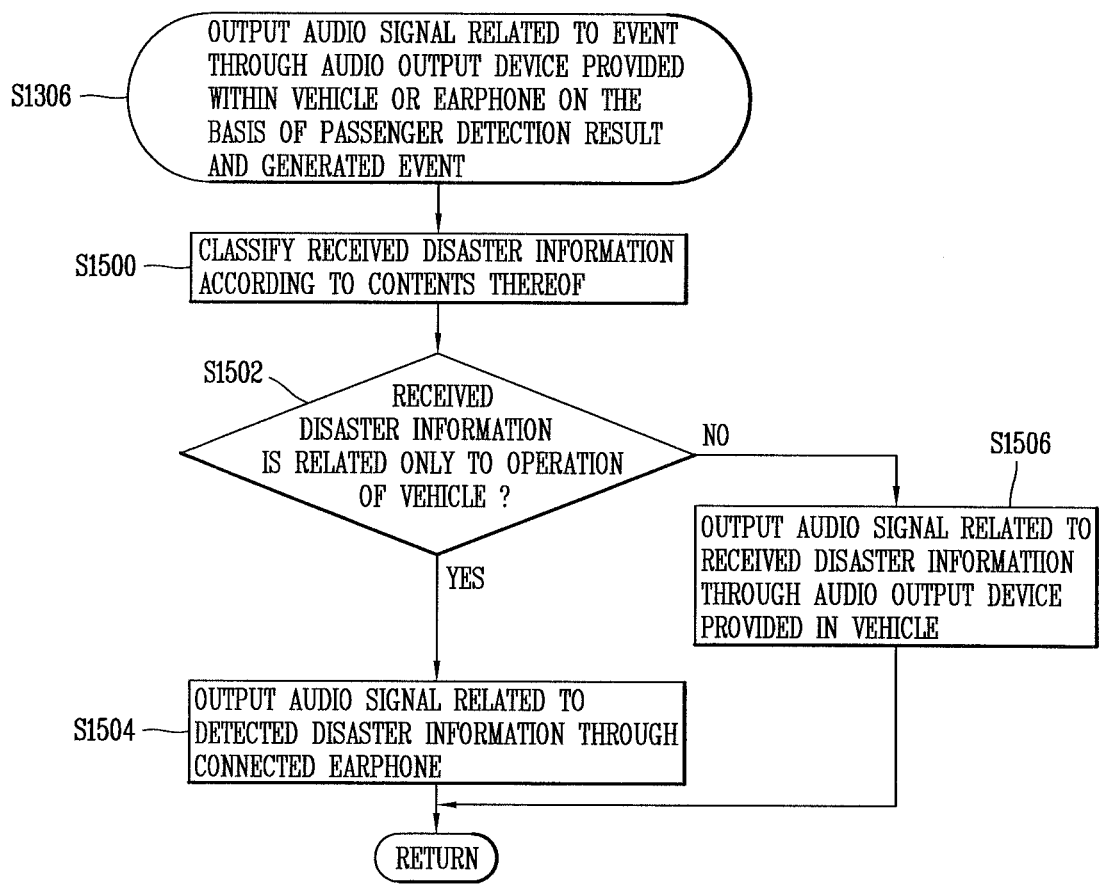
FIG. 15 is a flowchart illustrating an operational process in which an ear set device determines a path of outputting an audio signal related to disaster information when an event that occurs in a vehicle is reception of the disaster information.

FIG. 15 is a flowchart illustrating an operational process in which an ear set device 100 determines a path of outputting an audio signal related to disaster information when an event that occurs in a vehicle is reception of the disaster information.

In a case in which reception of disaster information is set as a preset event, when disaster information is received by the vehicle 1200 of the mobile device connected to the vehicle 1200 in step S1304, the control unit 111 of the ear set device 100 may determine that a preset event has occurred.

In such a case, the control unit 111 may classify the detected disaster information according to contents included in the disaster information (S1500). For example, in a case in which contents of the disaster information includes information indicating disaster that affects a region less than a predetermined level, such as an accident that occurs in an operation route of the vehicle, that is, in a road in which the vehicle 200 is currently located or a building, or the like, located within predetermined distance from the vehicle 1200, the control unit 111 may classify the corresponding disaster information as information related only to a current operation of the vehicle. Alternatively, in a case in which the disaster information includes information regarding a specific road or a bypass, the control unit 111 may classify the disaster information as information related only to an operation of the vehicle. This is because, an influence of the disaster that occurs is limited to a specific road or spot, and thus, when the driver changes the operation route of the vehicle 1200, the disaster may be easily avoided.

Meanwhile, in a case in which the disaster is information related to disaster that extensively includes an area in which the vehicle 1200 is currently located or an area of a predetermined level or greater, like ozone warning or powdery dust to warning, the control unit 111 may determine that the disaster information is not a disaster limited only to an operation of the vehicle 1200. In such a case, the control unit 111 may classify the disaster information as information that the passenger is required to listen to.

The control unit 111 may determine a path along which an audio signal regarding the received disaster information is to be output according to the result of classification in step S1500. For example, the control unit 111 may determine whether the currently received disaster information is related only to an operation of the vehicle according to the result of classifying the disaster information in step S1500 (S1502). In a case in which the currently received disaster information is related only to an operation of the vehicle according to the determination result in step S1502, the control unit 111 may output an audio signal related to the currently received disaster information through the earphones 150a and 150b (S1504). This is because, in a case in which the disaster information relates to disaster related to an operation of the vehicle 1200, it may be information required only for the user who currently drives the vehicle 1200.

Meanwhile, in a case in which the currently received disaster information is not related only to the operation of the vehicle, that is, in a case in which the currently generated disaster is not disaster related only to an operation of the vehicle 1200, the control unit 111 may output an audio signal related to the currently received disaster information through the audio output devices 1202 and 1204 (S1506). This is because, in a case in which the currently generated disaster is not a disaster related only to an operation of the vehicle 1200, the passenger also needs to listen to the disaster information.

Figure 16:
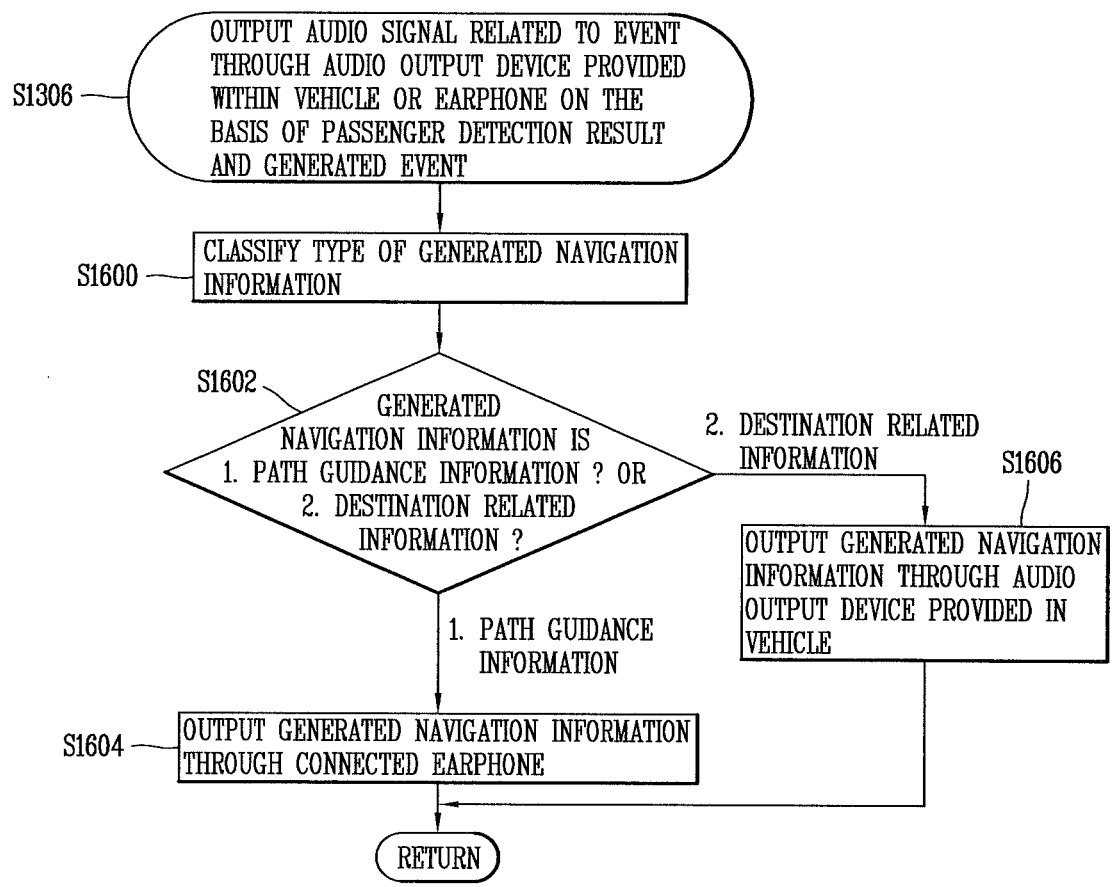
FIG. 16 is a flowchart illustrating an operational process in which an ear set device determines a path for outputting an audio signal related to navigation information when an event that occurs in a vehicle is the navigation information.

FIG. 16 is a flowchart illustrating an operational process in which the ear set device 100 determines a path for outputting an audio signal related to navigation information when an event that occurs in a vehicle is the navigation information.

For example, in a case in which a destination is set and an operation path reaching the destination is calculated form a current location of the vehicle 120, the navigation information may be generated. The navigation information may be generated to inform the user about a distance from the current location of the vehicle 1200 to the destination, an estimated arrival time at the destination, and the like, or may be generated to guide an operation route of the vehicle 1200 to the destination to the user. Also, the navigation information may further include traffic information in the currently calculated operation route of the vehicle 1200.

In some implementations, in a case in which the navigation information is generated, the control unit 111 of the ear set device 100 may detect that a preset event has occurred in step S1304 of FIG. 13. Then, the control unit 111 may classify a type of the generated ear set device 100 according to contents thereof (S1600).

For example, as described above, the navigation information may be classified as destination related information including a distance from the current location of the vehicle 1200 to the destination, an estimated arrival time at the destination, and the like, and traffic information related to a currently calculated operation route or a current operation route of the vehicle 1200.

In a case in which the currently generated navigation information is route guidance information, the control unit 111 may determine that the navigation information is related only to an operation of the vehicle 1200. This is because, the route guidance information may be information required only for the user who currently drives the vehicle 1200. Meanwhile, in a case in which the currently generated navigation information is destination related information, the control unit 111 may determine that the navigation information is not related only to an operation of the vehicle 1200. This is because, information such as a remaining distance to the destination or an estimated arrival time may be information also required for the passenger, as well as for the user who currently drives the vehicle 1200.

Thus, the control unit 111 may differentiate a path along which the currently generated navigation information is to be output as an audio signal according to the classification result in step S1600. For example, the control unit 111 may determine whether the currently generated navigation information is route guidance information or destination related information according to classification of the navigation information in step S1600 (S1602).

In a case in which the currently generated navigation information is route guidance information according to the determination result in step S1602, the control unit 111 may output the currently generated navigation information as an audio signal through the earphones 150a and 150b (S1604). Meanwhile, in a case in which the currently generated navigation information is destination related information according to the determination result in step S1602, the control unit 111 may output the navigation information as an audio signal through the audio output devices 1202 and 1204 (S1606).

Meanwhile, in step S1300 of FIG. 13, the passenger detection information received from the vehicle control unit of the vehicle 1200 may further include whether the passengers are asleep. For example, the vehicle control unit may detect whether the passengers riding in the vehicle 1200 together with the user are asleep from an image received through the camera provided within the vehicle. For example, the vehicle control unit may determine whether the passenger is asleep on the basis of a posture of the passengers, a degree of reclining of the back of a chair in a seat on which the passenger is seated, a movement of a part of the body of the passenger or a movement of an eyelid of the passenger, whether a pupil of the passenger is exposed, and the like, according to a result of analyzing the image. The vehicle control unit may transmit the detection result in step S1300 to the control unit 111 of the ear set device 100. Thus, the control unit 111 may detect whether the passenger is currently asleep.

Alternatively, in a case in which there is a passenger together with the user in the vehicle 1200, the control unit 111 of the ear set device 100 may receive biometric information of the passenger from a wearable device worn on the passenger. The control unit 111 may detect whether the passenger is asleep on the basis of the received biometric information. In some implementations, the biometric information received from the wearable device worn on the passenger may be received by the vehicle control unit of the vehicle 1200 and transmitted to the ear set device 100, or the ear set device 100 may directly receive the biometric information from the wearable device of the passenger.

Meanwhile, the control unit 111 of the ear set device 100 may also detect whether the passenger is asleep by using both the biometric information transmitted from the wearable device of the passenger and an internal image of the vehicle 1200. In such a case, the control unit 111 may detect whether a passenger who wears the wearable device not connected to vehicle control unit or the ear set device 100 or a passenger who does not wear a wearable device is asleep on the basis of a result obtained by analyzing the internal image of the vehicle, and may detect whether a passenger who wears a wearable device that can be connected to the vehicle control unit or the ear set device 100 is asleep on the basis of biometric information of the passenger received from the wearable device.

Meanwhile, in a case in which a passenger is asleep according to the detection result, the control unit 111 of the ear set device 100 may minimize interference with the sleep state of the passenger by an event that occurs in the vehicle 1200. FIG. 17 is a flowchart illustrating an operational process in which the ear set device 100 determines a path for outputting an audio signal related to a currently generated event.

Referring to FIG. 17, in a case in which occurrence of a preset event is detected, the control unit 111 of the ear set device 100 may detect a state of the passenger who are together with the user in the vehicle 1200 (S1700). In some implementations, as described above, the control unit 111 may use passenger detection information from the vehicle control unit of the vehicle 1200 in step S1300 of FIG. 13.

The control unit 111 may determine whether there is a passenger and whether the passenger is currently asleep according to the detection result in step S1700 (S1702). In a case in which there is no passenger or in a case in which there is a passenger and the passenger is not asleep according to a determination result in step S1702, the control unit 111 may output an audio signal related to the currently generated event through the audio output devices 1202 and 1204 provided within the vehicle 1200 (S1708). In such a case, as described above with reference to FIG. 14, in step S1708, the control unit 111 may output the audio signal related to the event through the audio output devices 1202 and 1204 according to the result of identifying the passenger. Alternatively, as illustrated above with reference to FIGS. 15 and 16, in a case in which the currently received disaster information or the generated navigation information is not information required only for an operation of the vehicle, the control unit 111 may output the audio signal related to the event through the audio output devices 1202 and 1204.

Meanwhile, in a case in which there is a passenger and at least one of the passenger is asleep according to the determination result in step S1702, the control unit 111 may determine whether the currently generated event includes information required for the passenger (S1704). The control unit 111 may output an audio signal related to the currently generated event through the earphones 150a and 150b (S1706) or through the audio output devices 1202 and 1204 according to the determination result in step S1704.

For example, in step S1704, in a case in which the currently generated event is a message received from a specific sender or a call transmitted from a specific caller, the control unit 111 may determine that the currently generated event is information not required for the passenger asleep. This is because, as described above, the message or the call is received by or terminated to the mobile device currently connected to the vehicle 1200, that is, the mobile device of the user. Thus, in a case in which the event such as reception of a message or a call termination occurs, even though the passenger is identified as a passenger previously set by the user, if the passenger is asleep, the control unit 111 may proceed to step S1706 and output an audio signal related to the received message or the terminated call through the earphones 150a and 150b.

Also, in a case in which the currently generated event is occurrence of navigation information, the control unit 111 may determine that the currently generated event does not include information required for the passenger asleep. Thus, even though the navigation information is navigation information (destination related information) including a distance to a destination or an estimated arrival time to the destination, if the passenger is asleep, the control unit 111 may proceed to step S1706 and output an audio signal related to the navigation information through the earphones 150a and 150b.

Meanwhile, in a case in which the current generated event is reception of disaster information, the control unit 111 may determine that the disaster information does not include information required for the passenger currently asleep on the basis of contents of the received disaster information in step S1704. For example, as described above with reference to FIG. 15, in a case in which the received disaster information is related to disaster related only to an operation of the vehicle 1200, the control unit 111 may determine that the disaster information does not include information required for the passenger currently asleep. However, as described above with reference to FIG. 15, in a case in which the received disaster information is information indicating occurrence of disaster extensively including an area of a predetermined level or greater, the control unit 111 may determine that the disaster information is information required for the passenger to listen to.

Alternatively, in a case in which the disaster information is received, the control unit 111 may determine that the disaster information is required for the passenger to listen to according to a degree of risk of the disaster according to the received disaster information. For example, the control unit 111 may analyze a degree of risk of the disaster according to the received disaster information on the basis of a preset disaster risk degree evaluation algorithm. In a case in which the analyzed degree of risk of the disaster is equal to or higher than a preset level, the control unit 111 may determine that the disaster information is required for the passenger to listen to. In such a case, the disaster risk degree evaluation algorithm may be an algorithm for analyzing a degree of risk of a type of disaster or characteristics (a wind velocity, an amount of rainfall, and the like) on the basis of a current geographical location of the vehicle 1200. For example, in a case in which it rains by an amount equal to or greater than a preset amount of rainfall in a specific area, the control unit 111 may calculate a degree of risk to be higher as a current location of the vehicle 1200 is closer to the specific area and as the amount of rainfalls is greater, on the basis of the disaster risk degree evaluation algorithm. The control unit 111 may determine that the disaster information is required for the passenger to listen to on the basis of the calculated degree of risk. In a case in which the degree of risk is equal to or greater than a preset level, the control unit 111 may proceed to step S1708 and output an audio signal related to the disaster information through the audio output devices 1202 and 1204.

Meanwhile, when noise related to an emergency situation described above with reference to FIG. 5 is detected, the control unit 111 of the ear set device 100 may determine that a preset event has occurred. The noise related to an emergency situation can be an alarming sound. In such a case, the control unit 111 may determine that the currently generated event includes information required for the passenger currently asleep in step S1704. Thus, the control unit 111 may receive the noise related to the emergency situation and output the received noise through the audio output devices 1202 and 1204 provided in the vehicle 1200. In a case in which the emergency situation noise is output through the audio output devices 1202 and 1204, the emergency situation noise may be received by the ear set device 100 through a microphone provided in the ear set device 100 and may also be output through the earphones 150a and 150b as described above with reference to FIG. 5.

Meanwhile, in the above description with reference to FIG. 17, a case in which any one of passengers riding in the vehicle 1200 together with the user is asleep is assumed and described, but such a setting may be modified by the user. That is, the user may set such that the operational process described above with reference to FIG. 17 may be performed only in a case in which all of the plurality of passengers are asleep in a case in which the passenger is in plurality.

Thus, in some implementations, since the user may be able to control a state of a vehicle by using the ear set device, the user may control various states of the vehicle in a state in which he or she listens to music through the ear set device, whereby high user convenience may be provided.

Also, in some implementations, when the user, in a state of wearing the ear set device, gets in a vehicle various types of information related to an operation of the vehicle may be provided through the earphone, whereby an influence of noise within the vehicle may be minimized when the user listens to the vehicle operation information.

Also, in some implementations, when the user, in a state of wearing the ear set device, gets in the vehicle, the user may control various devices positioned within the vehicle through the ear set device, whereby the user is not interfered with driving due to an event that occurs in various devices.

Also, in some implementations, in a case in which there is a passenger together with the user within the vehicle, when an event related to the user occurs in the vehicle, an audio signal related to the event may be output the ear set or through an audio output device provided within the vehicle on the basis of the passengers and the generated event, whereby the passenger is prevented from obtaining the information related to the event.

Also, in some implementations, when the passenger present together with the user in the vehicle is asleep, an audio signal related to the event is output through the ear set or the audio output device provided within the vehicle on the basis of a type or contents of the event that occurs in the vehicle, whereby the passenger asleep is prevented from being interfered with by the audio signal not required for the passenger.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the control unit 180 of the mobile device. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

What is claimed is:

1. An ear set device comprising:
   a main body; and
   one or more earphones configured to output a response signal,
   wherein at least one of the one or more earphones includes:
      a first detecting unit configured to detect whether the one or more earphones are attached to a user,
   wherein the main body includes
      a communication unit configured to perform wireless communication with the one or more earphones,
      a second detecting unit configured to detect a location of the main body, and
      a control unit configured to, based on a determination that the main body is inside a vehicle and a determination that the vehicle is operating while the one or more earphones are attached to the user, receive, from the vehicle, information related to an operation of the vehicle and output a response signal corresponding to the received information through the one or more earphones.

2. The ear set device of claim 1,
   wherein the vehicle further includes an audio output device configured to output the response signal in the vehicle,
   wherein the communication unit is configured to perform wireless communication with the audio output device,
   wherein the control unit is configured to:
      determine that a preset event has occurred in the vehicle,
      determine that a passenger is detected in the vehicle, and
      output a response signal related to the preset event through either one of the audio output device or the one or more earphones, and
      wherein the audio output device is configured not to output the response signal related to the preset event while the response signal related to the event is output through the one or more earphones.

3. The ear set device of claim 2, wherein the control unit is configured to
   determine that the preset event has occurred in the vehicle based on reception, by a mobile device connected to the vehicle, of a call or a message from a specific user,
   determine that the passenger is detected in the vehicle based on information received from a mobile device of the passenger or information received from the vehicle identifying the passenger, and
   output, based on the determination that the preset event has occurred in the vehicle and the determination that the passenger is detected in the vehicle, a sound alarm indicating reception of the call or the message through either one of the audio output device or the one or more earphones.

4. The ear set device of claim 3, wherein the control unit is configured to
   output, based on the determination that the call or the message is from the specific user or a determination that the detected passenger is a preset passenger, audio information regarding content of the preset event through the one or more earphones.

5. The ear set device of claim 2, wherein the control unit is configured to:
recognize that the preset event has occurred based on a determination that navigation information is generated, the navigation information including destination information related to a currently set destination and route guide information for guiding a route,
determine that the generated navigation information is the destination information or the route guidance information, and
output, based on the determination that the generated navigation information is the destination information or the route guide information, the navigation information through either one of the audio output device or the one or more earphones.

6. The ear set device of claim 2, wherein the control unit is configured to:
recognize that the preset event has occurred based on a determination that disaster information related to a current accident or a current disaster is received,
determine that the disaster information is related to the operation of the vehicle based on a determination that the disaster information includes information regarding a specific road or a bypass, and
output, based on the determination that the disaster information is related to the operation of the vehicle, the disaster information through either one of the audio output device or the one or more earphones.

7. The ear set device of claim 2, wherein the control unit is further configured to:
determine that the passenger is asleep based on a detection of the passenger, and
output, based on the determination that the passenger is asleep, audio information regarding content of the preset event through either one of the audio output device or the one or more earphones.

8. The ear set device of claim 7, wherein the control unit is configured to:
determine that the preset event includes content for the passenger based on a risk level identified from disaster information, and
output, based on the determination that the preset event includes the content for the passenger, audio information related to the preset event through either one of the audio output device or the one or more earphones.

9. The ear set device of claim 1, further comprising:
a microphone configured to monitor an external audio signal from outside of the main body,
wherein the control unit is configured to
detect a human voice from the external audio signal, and
output, based on a determination that the human voice is detected from the external audio signal, either the response signal corresponding to the received information or the human voice through the one or more earphones.

10. The ear set device of claim 9, wherein the control unit is configured to
suppress noise included in the external audio signal,
emphasize the human voice detected from the external audio signal, and
output either the human voice or the response signal corresponding to the received information.

11. The ear set device of claim 9, wherein the control unit is configured to
detect an alarming sound corresponding to a preset emergency from the external audio signal, and
output, in response to detecting the alarming sound corresponding to the preset emergency, the response signal through the one or more earphones.

12. The ear set device of claim 11, wherein the control unit is further configured to
detect a direction that the alarming sound corresponding to the preset emergency occurs, and
determine, based on the detected direction, at least one particular earphone from the one or more earphones to output the response signal.

13. The ear set device of claim 1,
wherein the vehicle is operating while the one or more earphones are attached to the user, and
wherein the control unit is configured to output, through the one or more earphones, a response signal corresponding to information related to a connection with at least one separate device located in the vehicle and information related to a preset event received from the connected separate device.

14. The ear set device of claim 13,
wherein the at least one separate device includes a mobile device of the user, and
wherein the control unit is configured to
recognize that, based on a determination that a specific function is executed in the mobile device, the preset event has occurred,
receive information related to the specific function from the mobile device, and
output a response signal corresponding to the information related to the specific function through the one or more earphones.

15. The ear set device of claim 14,
wherein the specific function is transmitting and receiving a message,
wherein the control unit is configured to
convert a text message, received by the mobile device, into a voice signal, and
output the converted voice signal through the one or more earphones, and
wherein the control unit is further configured to
detect a voice of the user,
convert the detected voice of the user into text information, and
control the mobile device to transmit a text message including the converted text information.

16. The ear set device of claim 1, wherein the control unit is configured to output, based on a direction change while the vehicle is navigated, an audio signal indicating the direction change and vibration through either one of the one or more earphones attached to the user, which correspond to a route of the vehicle changed at the specific point.

17. The ear set device of claim 1,
wherein the main body is not located in the vehicle, and
wherein the control unit is configured to control a state of the vehicle based on a distance between the vehicle and the main body.

18. The ear set device of claim 1,
wherein the first detecting unit is further configured to sense a biometric signal of the user, and
wherein the control unit is configured to
identify the biometric signal of the user,
determine, based on the biometric signal of the user, that the user is drowsy while the vehicle is operating, and
output, based on the determination that the user is drowsy while the vehicle is operating, preset white noise through the one or more earphones.

19. A method for controlling an ear set device, the method comprising:
- detecting whether one or more earphones of an ear set device are attached to a user;
- detecting whether the ear set device is located within a preset vehicle;
- detecting whether the vehicle is operating;
- determining that the user requires information related to an operation of the vehicle; and
- receiving, in response to determining that the user requires the information related to the operation of the vehicle, the information related to the operation of the vehicle from the vehicle, and
- outputting, through the one or more earphones, a response signal corresponding to the received information.

20. The method of claim 19, further comprising:
- detecting whether a passenger other than the user is present within the vehicle;
- detecting whether an preset event occurs in the vehicle; and
- outputting, based on a determination that the passenger other than the user is detected in the vehicle and a determination that the preset event has occurred in the vehicle, the response signal related to the preset event through either one of an audio output device provided in the vehicle or the one or more earphones,
- wherein the audio output device is configured not to output the response signal related to the preset event while the response signal related to the preset event is output through the one or more earphones.

* * * * *